(12) United States Patent
Loutit

(10) Patent No.: US 9,741,008 B2
(45) Date of Patent: Aug. 22, 2017

(54) APPARATUS AND METHOD FOR FINDING AND REPORTING LOST ITEMS

(71) Applicant: Consumer Product Recovery and Finance Company, Inc., Austin, TX (US)

(72) Inventor: James F. R. Loutit, Austin, TX (US)

(73) Assignee: Consumer Product Recovery and Finance Company, Inc., Austin, TX (US)

(*) Notice: Subject to any disclaimer, the term of this patent is extended or adjusted under 35 U.S.C. 154(b) by 660 days.

(21) Appl. No.: 13/887,038

(22) Filed: May 3, 2013

(65) Prior Publication Data
US 2014/0327518 A1 Nov. 6, 2014

(51) Int. Cl.
| | |
|---|---|
| G08B 5/22 | (2006.01) |
| G08B 13/14 | (2006.01) |
| G06F 17/30 | (2006.01) |
| G06F 7/00 | (2006.01) |
| G06F 3/048 | (2013.01) |
| G06Q 10/08 | (2012.01) |

(52) U.S. Cl.
CPC .................. G06Q 10/08 (2013.01)

(58) Field of Classification Search
CPC ......... G08B 5/22; G08B 5/224; H04W 12/06; H04W 12/12; H04W 4/028
USPC ............ 340/7.58, 571, 5.31, 457, 572.1; 455/410, 411, 418; 705/75, 50; 707/104.1, 3, 6
See application file for complete search history.

(56) References Cited

U.S. PATENT DOCUMENTS

| | | | |
|---|---|---|---|
| 6,259,367 B1* | 7/2001 | Klein | B25J 9/08 |
| | | | 235/375 |
| 6,433,685 B1* | 8/2002 | Struble | B60R 25/00 |
| | | | 340/426.28 |
| 6,577,714 B1 | 6/2003 | Darcie et al. | |
| 7,318,069 B2* | 1/2008 | Takahashi | G06F 17/30525 |
| 8,248,237 B2* | 8/2012 | Fitzgerald | G06F 21/88 |
| | | | 340/457 |
| 8,600,357 B2* | 12/2013 | Sterlino | H04M 3/5158 |
| | | | 340/539.2 |
| 8,810,392 B1* | 8/2014 | Teller | G08B 21/24 |
| | | | 235/385 |
| 8,812,476 B2* | 8/2014 | Hope | G06F 17/30876 |
| | | | 707/706 |
| 8,932,368 B2* | 1/2015 | Fitzgerald | H04W 12/12 |
| | | | 455/411 |

(Continued)

OTHER PUBLICATIONS https://itunes.apple.com/us/app/crowdfynd/id619606771; May 10, 2013.

(Continued)

Primary Examiner — Nam V Nguyen
(74) Attorney, Agent, or Firm — Pillsbury Winthrop Shaw Pittman LLP

(57) ABSTRACT

Provided is a system, having: a lost-and-found system, implemented with one or more processors, the lost-and-found system having a server and a data repository, the data repository storing venue records; and a plurality of mobile devices each having a lost-and-found mobile application, the lost-and-found mobile application being operative to report a found or a lost item and associate the found item or the lost item with one of the venue records.

21 Claims, 27 Drawing Sheets

(56) References Cited

U.S. PATENT DOCUMENTS

| | | |
|---|---|---|
| 9,408,072 B2 * | 8/2016 | Bombolowsky ...... H04W 12/12 |
| 2002/0057212 A1 | 5/2002 | Hamilton et al. |
| 2004/0002998 A1 | 1/2004 | Takahashi et al. |
| 2009/0117926 A1 | 5/2009 | Sterlino |
| 2009/0292464 A1 | 11/2009 | Fuchs et al. |
| 2010/0188226 A1 * | 7/2010 | Seder .................... G08B 21/24 |
| | | 340/572.1 |
| 2011/0047033 A1 | 2/2011 | Mahaffey et al. |
| 2011/0061018 A1 | 3/2011 | Piratla et al. |
| 2012/0059661 A1 | 3/2012 | Colodny et al. |
| 2012/0259722 A1 | 10/2012 | Mikurak |
| 2012/0265694 A1 | 10/2012 | Tuchman et al. |
| 2012/0266258 A1 | 10/2012 | Tuchman et al. |
| 2012/0324542 A1 | 12/2012 | Mclaughlin et al. |
| 2013/0165148 A1 | 6/2013 | Bahl et al. |
| 2014/0281857 A1 | 9/2014 | Colodny et al. |

OTHER PUBLICATIONS support.apple.com/kb/ph2696; May 8, 2013.
http://web.archive.org/web/20120426235216/http:/www.lostandfound.com/; Aug. 7, 2013.
https://play.google.com/store/apps/details?id=com.websiteinstantly.lostfound&feature=search_result#?t=W251bGwsMSwxLDEslmNvbS53ZWJzaXRIaW5zdGFudGx5Lmxvc3RmbS3VuZCJd; Aug. 7, 2013.
https://play.google.com/store/apps/details?id=bidland.lostfound.mobile&feature=search_result#?t=W251bGwsMSwxLDEslmJpZGxhbmQuG9zdGZvdW5kLm1vYmlsZSJd; Aug. 7, 2013.
https://play.google.com/store/apps/details?id=com.homeagain.petrescuers&feature=search_result#?t=W251bGwsMSwxLDEslmNvbS5ob21lYWdhaW4ucGV0cmVzY3VlcnMiXQ; Aug. 7, 2013.
https://play.google.com/store/apps/details?id=com.apporder.boomerang&feature=search_result#?t=W251bGwsMSwxLDEslmNvbS5hcHBvcmRlci5ib29tZXJhbmciXQ; Aug. 7, 2013.
International Search Report & Written Opinion for PCT App. No. PCT/US2014/035691, mailed Sep. 26, 2014. (pp. 1-13).
Non-Final Office Action for related U.S. Appl. No. 14/087,716, dated May 19, 2016, pp. 1 to 14.
European Supplementary Search Report for related EPO Patent Application 14791875.9, dated Sep. 1, 2016, pp. 1 to 10.

* cited by examiner

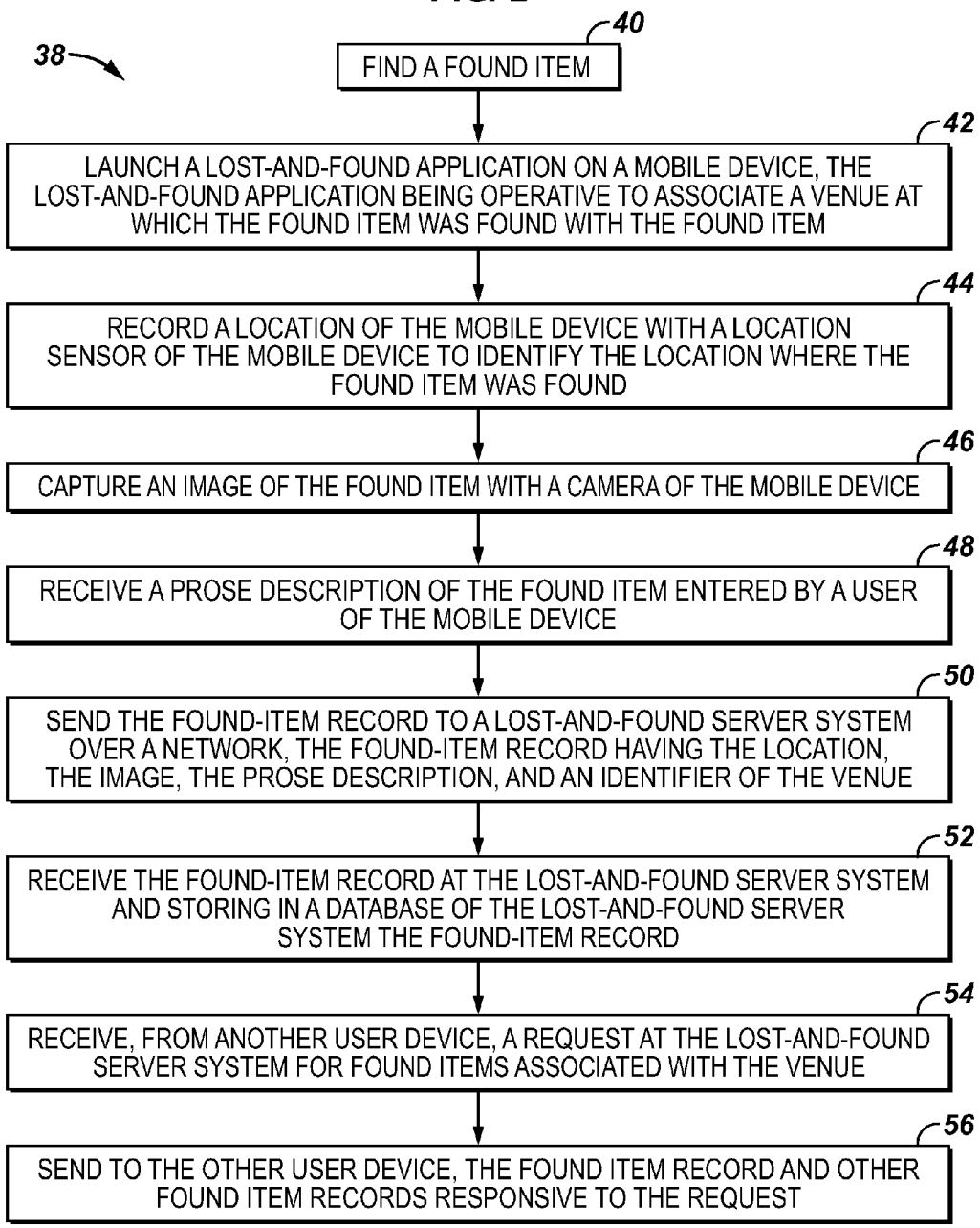

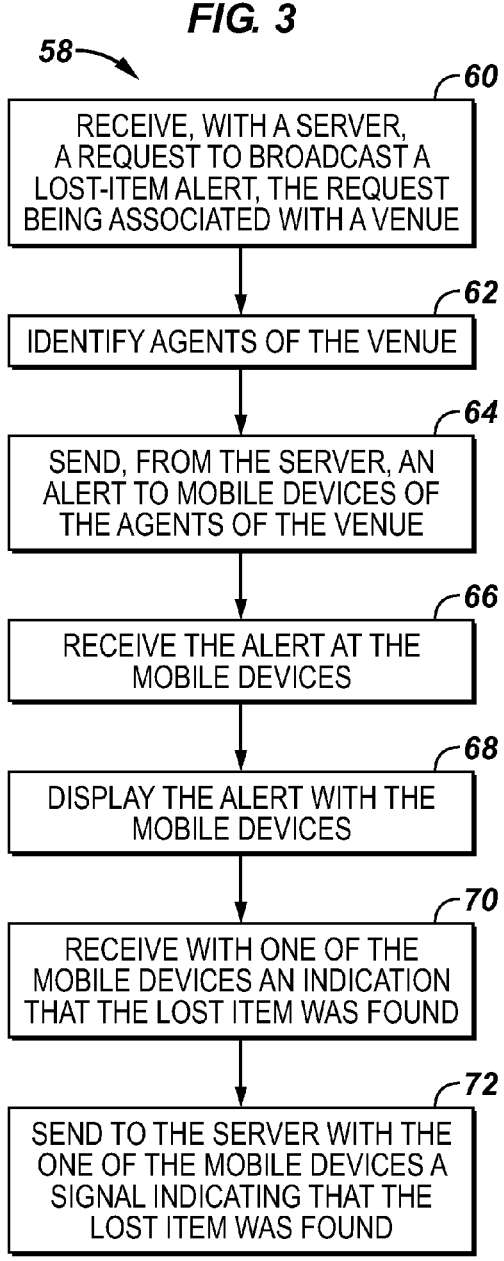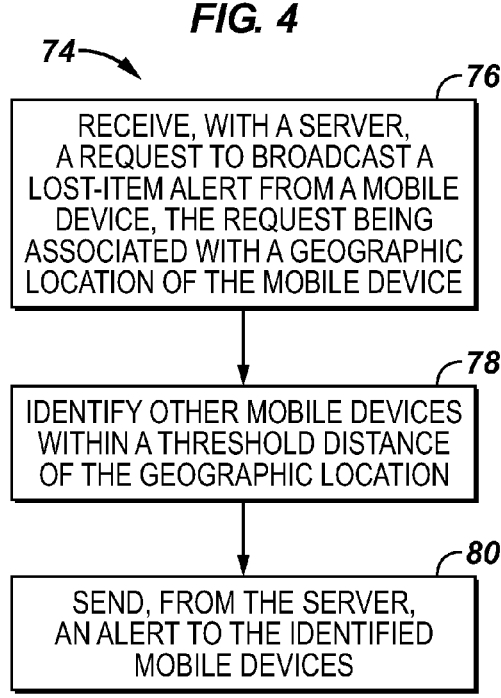

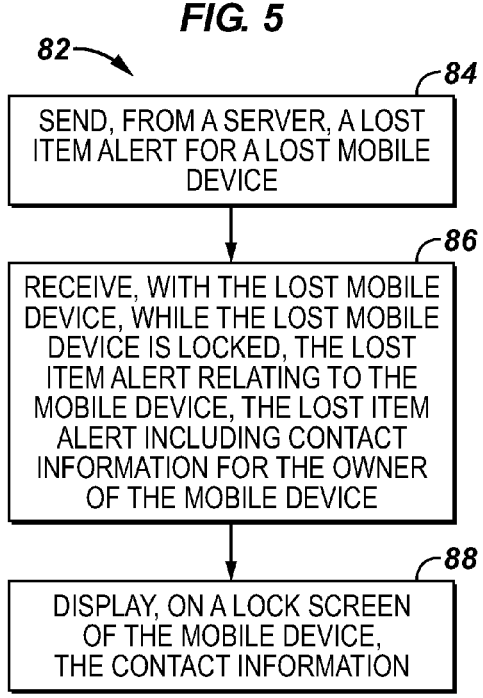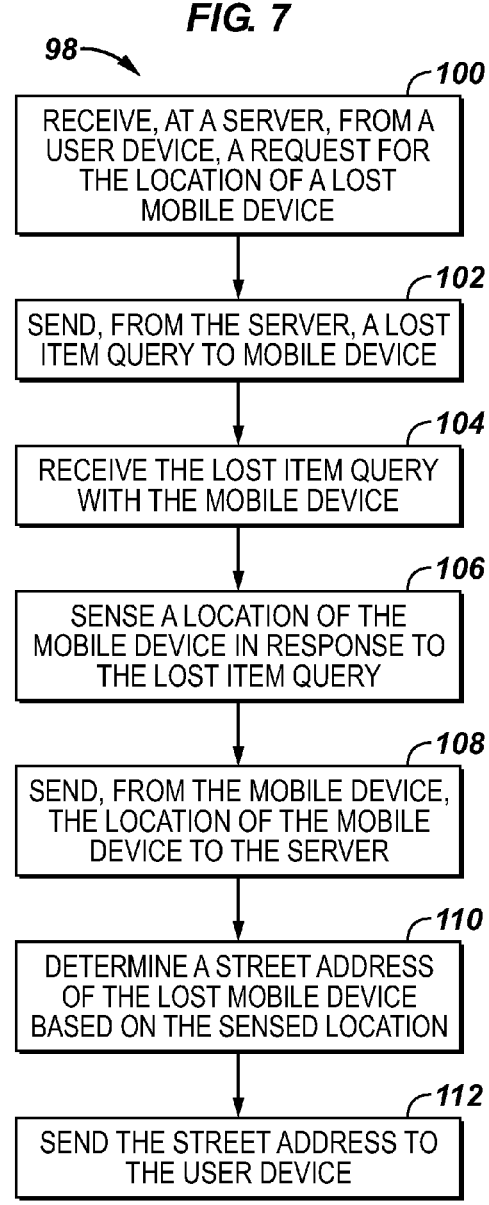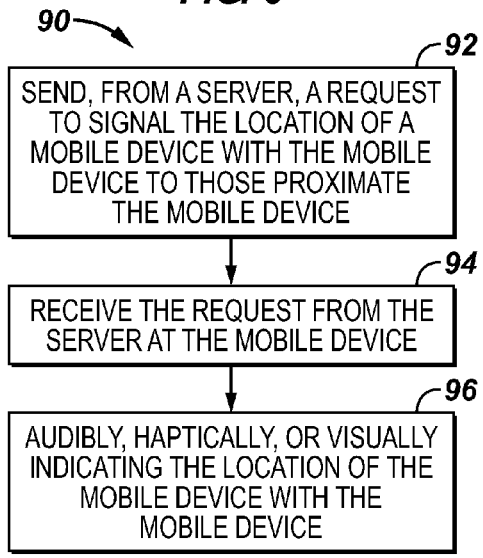

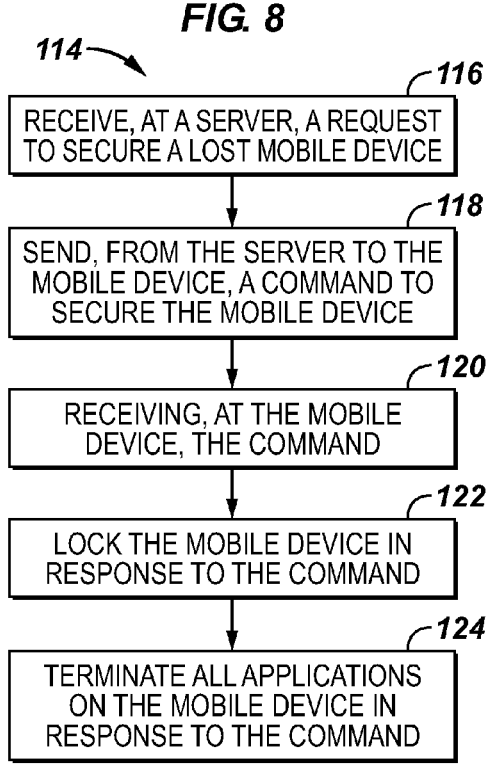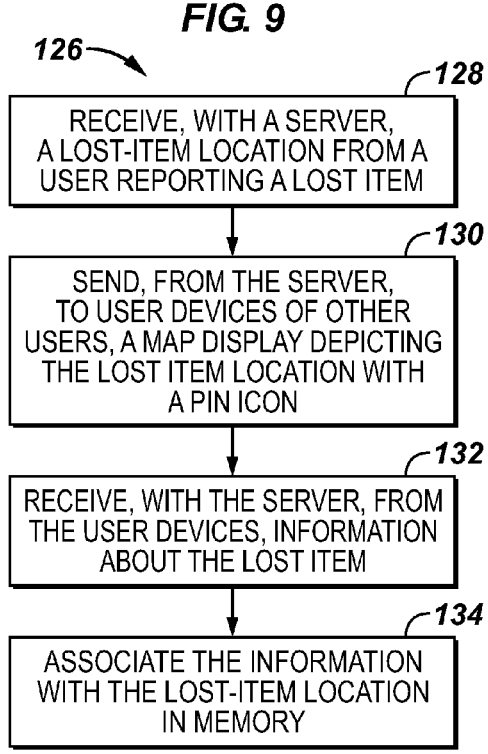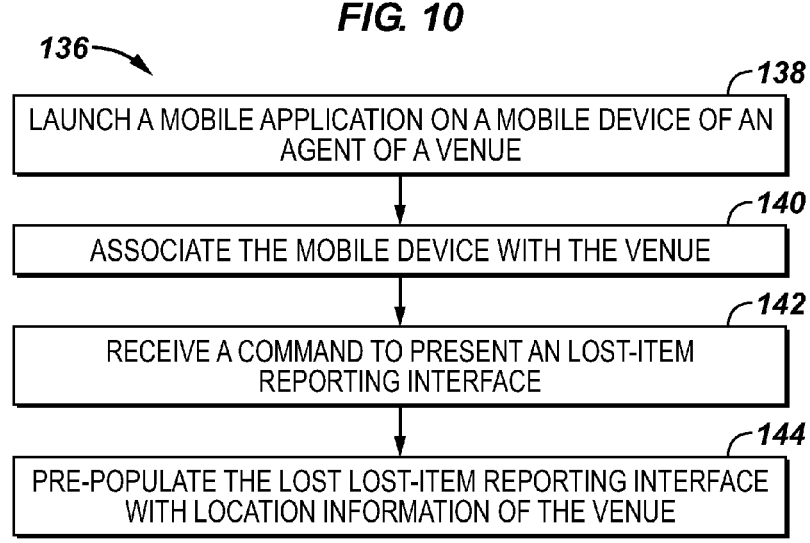

*FIG. 11*

LostAndFound.com Mobile
*The Internet Lost and Found, Inc.*

Back | Samsung Galaxy S

Listing Details

Samsung Galaxy S

This item was Lost on July, 26th 2011.

| Category | Cellular, Mobile Phones, Phones, WalkieTalkies |
|---|---|
| Gender | Unknown |
| Brand | Samsung |
| Description | Samsung Galaxy S |

Location Details

Reported Lost on this venue:

Test Location AUTOAPPROVE

Home | Report Item | Search | My Account | My Venue

FIG. 13

LostAndFound.com Mobile
*The Internet Lost and Found, Inc.*

Welcome to LostAndFound.com

Featured Listings in Your Area

| Richmond. Dogs | Chicago. Dogs | Murrieta. Cats | Peoria. Rings | Chains, Necklaces |

| LOST | FOUND |
| --- | --- |

Samsung Galaxy S
Garden City, KANSAS

Gold Chains
Nome, ALASKA

Game Tickeys
Los Angeles, CALIFORNIA

Samsung Galaxy S
Chandler, ARIZONA

Home | Report Item | Search | My Account | My Venue

FIG. 26

APPARATUS AND METHOD FOR FINDING AND REPORTING LOST ITEMS

BACKGROUND

1. Field

The present invention relates generally to electronic devices and processes and, more specifically, to mobile applications and websites for interacting with a lost-and-found system.

2. Description of the Related Art

Frequently people lose pets and other, often dearly held, personal property, while other people, often strangers, find the lost items. In some cases, those who lose items and those who find items communicate with one another using electronic networked lost-and-found systems, for example, websites for posting descriptions of lost items, descriptions of found items, and searching such descriptions. Further, mobile applications exist for facilitating such transactions in the context of a hand-held mobile device, such as a smart phone. These existing systems, however, suffer from a number of deficiencies relating to ease of use, finding items for which no one has reported the loss item, securing lost electronic devices, and pushing lost-item alerts out to those in a position to find the lost item, among other problems.

SUMMARY

The following is a non-exhaustive listing of some aspects of the present techniques. These and other aspects are described in the following disclosure.

Some aspects include a system, having: a lost-and-found system, implemented with one or more processors, the lost-and-found system having a server and a data repository, the data repository storing venue records; and a plurality of mobile devices each having a lost-and-found mobile application, the lost-and-found mobile application being operative to report a found or a lost item and associate the found item or the lost item with one of the venue records.

Some aspects include the system above, wherein the lost-and-found system is operative to: receive a request to broadcast a lost-item alert, the request being associated with a venue in the venue records; identify agents of the venue; and send an alert to selected mobile devices, the selected mobile devices being mobile devices of the agents of the venue. And wherein the mobile application is operative to: receive the alert at the selected mobile devices; and display the alert with the selected mobile devices.

Some aspects include the system above, wherein the lost-and-found system is operative to: receive a request to broadcast a lost-item alert, the request being associated with a geographic location; identify mobile devices within a threshold distance of the geographic location; and send an alert to the identified mobile devices.

Some aspects include the system above, wherein the mobile application is operative to: receive, while a lost mobile device is locked, a lost-item alert relating to the lost mobile device, the lost-item alert including contact information for the owner of the mobile device and/or location recovery instructions for the owner of the mobile device; and display, on a lock screen of the lost mobile device, the contact information.

Some aspects include the system above, wherein the mobile application is operative to: receive a request to signal the location of a lost mobile device with the lost mobile device to those proximate the lost mobile device; and in response, audibly, haptically, or visually indicate the location of the mobile device with the lost mobile device.

Some aspects include the system above, wherein the lost-and-found system is operative to: receive, from a user device, a request for the location of a lost mobile device; send a lost item query to mobile device; determine a street address of the lost mobile device based on a responsive sensed location; and send the street address to the user device. And wherein the mobile application is operative to: receive the lost item query with the lost mobile device; sense a location of the lost mobile device in response to the lost item query; and send the location of the lost mobile device.

Some aspects include the system above, wherein the lost-and-found system is operative to: receive a request to secure a lost mobile device; and send a command to secure the lost mobile device. And wherein the mobile application is operative to: receive the command; lock the lost mobile device in response to the command; and terminate all applications on the lost mobile device in response to the command.

Some aspects include the system above, wherein the lost-and-found system is operative to: receive a lost-item location from a user reporting a lost item; and send to user devices of other users, a map display depicting the lost item location with a pin icon.

Some aspects include the system above, wherein the mobile application is operative to: associate the mobile device with a venue; receive a command to present an lost-item reporting interface; and pre-populate the lost lost-item reporting interface with location information of the venue.

Some aspects include one or more devices, each having a processor and memory storing instructions such that the devices, when executing the instructions provide the above-described functionality.

Some aspects include a tangible, non-transitory, machine-readable medium storing instructions that when executed by a data processing apparatus cause the data processing apparatus to perform operations providing the above-mentioned functionality.

BRIEF DESCRIPTION OF THE DRAWINGS

The above-mentioned aspects and other aspects of the present techniques will be better understood when the present application is read in view of the following figures in which like numbers indicate similar or identical elements:

FIG. 2 shows an example of a process for reporting a lost item with a mobile device;

FIG. 3 shows an example of a process for pushing lost-item alerts to mobile devices of employees and other agents of a particular venue;

FIG. 4 shows an example of a process for broadcasting a lost-item alert to mobile devices of users within a selected geographic area;

FIG. 5 shows an embodiment of a process for communicating contact information via a lock screen of a lost mobile device;

FIG. 6 shows an embodiment of a process for causing a mobile device to alert those proximate the mobile device of its location;

FIG. 7 shows an embodiment of a process for displaying the street address of a lost mobile device to those looking for the lost mobile device;

FIG. 8 shows an embodiment of a process for securing a lost mobile device remotely;

FIG. 9 shows an embodiment of a process for displaying the last known location of a lost item on a map display;

FIG. 10 shows an embodiment of a process for pre-populating a lost-item interface with information about a venue associated with the user of a mobile device presenting the lost item interface;

FIGS. 11-31 shows an example of a mobile device interface for interacting with a lost-and-found system;

Figure 1:
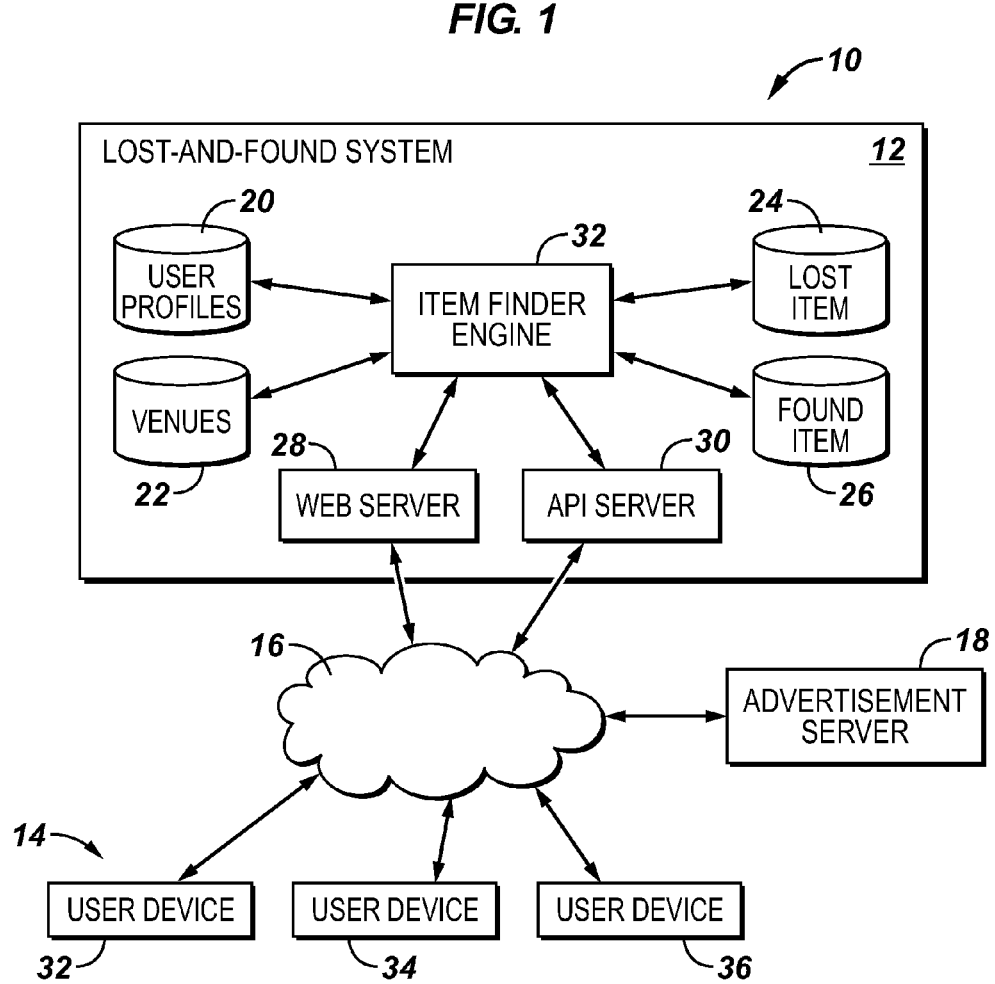
FIG. 1 shows an embodiment of a computing environment having a lost-and-found system.

While the invention is susceptible to various modifications and alternative forms, specific embodiments thereof are shown by way of example in the drawings and will herein be described in detail. The drawings may not be to scale. It should be understood, however, that the drawings and detailed description thereto are not intended to limit the invention to the particular form disclosed, but to the contrary, the intention is to cover all modifications, equivalents, and alternatives falling within the spirit and scope of the present invention as defined by the appended claims.

DETAILED DESCRIPTION OF CERTAIN EMBODIMENTS

FIG. 1 shows an example of a computing environment 10 having an embodiment of a lost-and-found system 12 and mobile user devices 14 configured to address some of the above-mentioned deficiencies with existing systems. In particular, the lost-and-found system 12 may cooperate with a mobile application on the user devices 14, in various embodiments, to provide all or sub-combinations of the following features:

a. an alert system operable to send an alert (e.g., a lost-item alert or a found-item alert) to all employees or volunteers of a venue via the mobile devices of those employees or volunteers, and in some cases, subsets of employees or volunteers of a venue, such as those associated with a specific location parameter (e.g., airline agents associated with a given terminal of an airport);

b. an alert system operable to send an alert to mobile devices of users within a radius of a lost (or found) item location;

c. a lost mobile device messaging feature by which the mobile devices receive a command that causes the mobile devices to display a message on a lock screen, a start/power up page, or other display of the mobile device, such that the owner can communicate instructions to a finder of the lost mobile device without the finder unlocking the mobile device;

d. a lost mobile device finding feature by which an owner who lost their mobile device can cause their lost mobile device to emit noise, other vibrations, or light to assist with locating the mobile device;

e. another lost mobile device finding feature by which a lost mobile device reports its location and that location is displayed to the owner as a street address derived using GPS coordinates;

f. a lost mobile device shutdown feature by which a route lost mobile device can be remotely secured by terminating all applications and access to the lost mobile device;

g. a lost item pinning interface by which a user can identify a lost item location on a map and that map is distributed to other users mobile devices such that a concerted search and rescue effort can be coordinated; and h. a lost or found interface associated with a venue that pre-populates fields of the interface with information about the venue, such that an employee or volunteer of the venue can file a lost or found item report with greater ease relative to conventional systems.

It should be noted, however, that not all embodiments include all of these features, or any of these features, as various implementations address these and other problems described below and various engineering and cost trade-offs are envisioned. Further, embodiments include components of the computing environment 10, without including other components, for example the lost-and-found system 12 in isolation, the user devices 14, in isolation, and code or hardware by which such components are configured, which is not to suggest that other features are required in any embodiment.

In this example, the lost-and-found system 12 communicates with the user devices 14 via the Internet 16 and various other networks, such as cellular networks, local area networks, wireless area networks, and the like. Further, the lost-and-found system 12 communicates with an advertisement server 18, in some embodiments, by which advertisements are displayed along with lost item reports, found item reports, or other interfaces, thereby generating ad revenue in some embodiments. Each of the components of the computing environment 10 may be remote from one another, for example distributed geographically over an entire country or the world with communication facilitated via the Internet 16.

The lost-and-found system 12 may be implemented with one or more servers, for example, in a data center, and may include various components for load-balancing, backup, data storage, and interfacing with the Internet 16. In this embodiment, the lost-and-found system 12 includes a user profile data repository 20, a venues data repository 22, a lost item data repository 24, a found item data repository 26, a web server 28, an application program interface (API) server 30, and an item-finder engine 32, each of which may communicate with one another. These components may be embodied as separate computing devices, separate processes within a given computing device, items in memory accessible to a process on a computing device, or combinations of data and functionality, for example as objects in object oriented code. The components of the lost-and-found system 12 are illustrated as discrete functional blocks, but it should be understood that in some embodiments, these components may be differently arranged, for example, intermingled, conjoined, subdivided, distributed, or co-located.

The user profile data repository 20, in some embodiments, includes a plurality of user profile records, each record including an identifier unique to a given user, a user name, a user password, pointers to lost item reports reported by the user, pointers to found item reports reported by the user, and pointers to venues with which the user is associated (or such pointers, if included, may be present in corresponding records the other repositories). The venues data repository 22 includes a plurality of venue records, each venue record being associated with a different venue, and in some cases, some of the venue records being associated with one another as different locations in a chain a venues. Each venue record may include a geographic location of the venue, a unique identifier of the venue, a category of the venue, a sub-category of the venue, pointers to user records of users associated with the venue (e.g., employees or volunteers), pointers to lost item records associated with the venue, and pointers to found item records associated with the venue (or such pointers, if included, may be present in corresponding records the other repositories). In some cases, each venue record is further associated with images of the venue, for instance, a logo, a map, or the like. Venue records may also include constituent venue areas, such as spatial subsets of the venue (e.g., a terminal of an airport or floor of a hotel), or subsets of employees of the venue (e.g., janitorial staff), and those users associated with the constituent areas may be identified in the repository. In instances in which a venue is identified, the constituent area and associated data may also be identified. The illustrated lost item data repository 24, in some embodiments, includes a plurality of lost item records, each lost him item record having a unique identifier, a description in prose of the lost item, an image of the lost item, a category of the lost item, a subcategory of the lost item, a date that the lost item was reported, comments on the lost item, a flag indicating whether the lost item has been found or the record is closed, a value indicative of whether a user has paid to have the lost item featured prominently, a pointer to a user profile record of a user who reported the lost item, and a pointer to a venue at which the item was reported lost (or such pointers, if included, may be present in corresponding records the other repositories). In some embodiments, the found item data repository 26 includes a plurality of found item records, each found item record including a unique identifier, a date on which the item was reported found, a prose description of the item, an image of the item, a category of the item, a subcategory of the item, a pointer to a user profile record of the user who reported found item, a pointer to a venue at which the item was found (or such pointers, if included, may be present in corresponding records the other repositories), a flag indicating whether the found item has been claimed, and a geographic location (e.g. a latitude and longitude and confidence value) at which the item was found or reported found. It should be understood that not all embodiments include all of these fields in all or any of the records, and that the description of the various fields of these records is merely exemplary and other fields may be included, which is not to suggest that any other description is exclusive of other features or requires all features. The various data repositories may be embodied as documents, for example hierarchical key-value pairs stored in XML for instance, as program state, or as combined or discrete relational databases, in some embodiments.

The illustrated web server 28, in some embodiments, is operative to receive requests for web content (e.g., information encoded in hypertext markup language, cascading style sheets, JavaScript™, and resources referenced by such encoding, for example images, video, sound, and the like) conveyed via a application layer protocol, such as hypertext transport protocol or SPDY™. The web server 28 may monitor a port designated for receipt of such requests, determine the appropriate response based on the content of such requests, and engage the other components of the lost-and-found system 12 to address the requests, responding with web content responsive to the requests, for example, a webpage showing lost items, found items, or various interfaces by which items are reported lost, items are searched, items are reported found, venues are established, or users are associated with venues. The webpages may be formatted based on a user agent field associated with the request, for example providing webpages formatted for smaller screens on mobile display devices in response to a user agent field indicating that the device is a mobile device, or a full webpage in response to a user agent field indicating that such a display would be appropriate.

The illustrated API server 30, in some embodiments, is operative to receive, process, and respond to application program interface requests, for example, from a mobile application executing on user devices 14. In some cases, the application program interface includes predefined commands by which structured data and commands are conveyed between the user devices 14 and the lost-and-found system 12, for instance, commands or data encoded in a serialized data format, such as extensible markup language (XML) or JavaScript object notation (JSON). In other embodiments, the mobile user devices execute a mobile application that includes a webview, and communication via the mobile applications is accomplished with the web server 28.

The illustrated item-finder engine 32 is operative to effectuate the processes and interfaces described below with reference to FIGS. 2 through 31. Further, the item finder 32 is operative to receive requests to search, update, or otherwise change records in each of the data repositories 20, 22, 24, and 26 in response to requests from the web server 28 or the API server 30. In some cases, the item finder engine 32 includes multiple processes each handling a different request, for example concurrently, to expedite responses to requests or other commands to the web server 28 or the API server 30. The item-finder engine 32, in some examples, is operative to join records between the various data repositories, for instance finding user profiles associated with a given venue, lost items associated with a given venue, found items associated with a given venue, lost items within a given category and subcategory, found items associated with a given user profile or a given venue, or based on various other combinations of the fields within the data repositories.

The user devices 14 include three user devices 32, 34, and 36 by way of example, but embodiments are consistent with substantially more, for example thousands, tens of thousands, or hundreds of thousands, or more user devices distributed over a relatively large geographic area, for example an entire country, or the planet. Accordingly, operation of the lost-and-found system 12 occurs, in some cases, at web scale, handling a relatively large number of transactions, thereby taking advantage of network effects by which the likelihood of a lost item report matching a found item report or search is increased.

In some cases, each of the user devices 14 is a hand-held mobile user device, for example, a smart phone or tablet having a portable power source, for instance, a battery. Each user device 14 may include a processor, memory, a wireless interface by which the mobile device communicates through the Internet 16. The mobile devices may include an operating system and mobile applications, executing within the operating system on the processor, by which the mobile devices communicate with the lost-and-found system 12. The mobile applications may include a web browser by which the user devices 14 communicate with the lost-and-found system 12, or the mobile applications may be a special-purpose mobile application, for example, downloaded from a site hosted by a vendor of the operating system. The mobile applications may be configured by a user during the installation process to have various permissions, for example, permission to access geolocation data from a location sensor of the mobile device, permission to communicate via the Internet with the lost-and-found system 12, and permission to interact with a lock screen of the mobile device.

The operating systems of the mobile devices may include a lock screen feature by which the mobile device is generally disabled when locked, for example, in response to remaining idle, without user interaction, for some threshold duration of time. The lock screen may present a relatively limited amount of information to a person operating the mobile device when the lock screen is displayed, for example, an interface by which the mobile device can be unlocked with a password. In some cases, the lock screen also includes the capability of displaying a limited amount of information to a user, and embodiments may engage this functionality to convey information to users after a phone is lost, as described below.

The illustrated advertisement server 18 may be operative to display advertisements within the mobile applications on the user devices 14 or on webpages from the lost-and-found system 12. In some cases, the advertisements are selected based on the state of the interface displayed to a user, for example, advertisements for cell phones may be displayed in response to a user entering a lost item report in the category of cell phones.

FIG. 2 shows an embodiment of a process 38 for reporting a lost item with a mobile device. The process 38, in some instances, is performed by the above-described lost-and-found system 12 and two or more of the user devices 14 (some of which may be non-mobile devices, such as a desktop computer). However, embodiments are not limited to the particular arrangement described above. The process 38, like the other processes described herein, may be embodied as program code stored on a tangible, non-transitory, machine-readable medium, examples of which are described below with reference to FIG. 32 as examples of computer memory.

In this example, the process 38 includes finding a found item, as indicated by block 40. The found item may be any of a variety of different types of items which one might lose, common examples being pets, children, cell phones, clothing items, and the like. This step may be performed by a user of one of the above-described mobile user devices 14, for example, an employee of a venue or a visitor of a venue, or the item may be found by someone without any association with any particular venue.

Next, a lost-and-found application is launched on a mobile device, as indicated by block 42. In this example, the lost-and-found application is operative to associate a venue at which the item was found with the found item. Venues may be any place having a record in the venues data repository 22 described above. For instance, a venue may be a park, a hotel, a restaurant, a doctor's office, or other place. The mobile application may be associated in memory with the venue, for example, the mobile application may be associated with a user identifier in memory of the mobile user device, and the user identifier may be associated with a venue in the user profile data repository 20 or the venues data repository 22 of the lost-and-found system 12 described above. In another example, the association may be present within the mobile application memory, for example in a configuration file or other persistent storage. In some cases, the user may associate the mobile application with a venue during a configuration process of the mobile application, for example, by identifying a venue. In another example, venue accounts may be hosted by the lost-and-found system 12, and the mobile application may be associated with the venue account during a process of configuring the venue account, for example, by a manager of the venue, having elevated privileges in the system, using an interface by which employees or volunteers of the venue are added to the venue account. In this example, the association may be queried from the lost-and-found system 12 described above or retrieved from memory of the mobile device.

Next in this embodiment, a location of the mobile device is recorded with a location sensor of the mobile device to identify the location where the item was found, as indicated by block 44. The location may be obtained with a global positioning system (GPS) (or other satellite-based system, such as the GLONASS or Galileo systems) sensor of the mobile device or based on the current wireless environment of the mobile device, for example, by triangulating position from cellular towers or based on the presence of particular wireless networks known to be at a particular geographic location. The recorded location may be a latitude and longitude of the mobile device, and the location may be qualified with a confidence score indicative of a radius in which the mobile device is likely to be with some level of confidence. This step may be performed by the above-described mobile application operating on one of the user devices 14 in response to a user requesting an interface by which lost items or reported. In some cases, the user is presented with the opportunity of selecting the current location of the mobile user device or manually entering some other location, for example a location at which a lost item was found earlier in the day.

In some embodiments, the process 38 further includes capturing an image of the found item with a camera of the mobile device, and indicated by block 46. In some cases, the interface for reporting found items may include a button that launches a camera interface by which an image is captured, and upon capturing an image, the interface may reappear for continued interaction by which the user describes the found item and circumstances in which the item was found. Further, some embodiments may retrieve an image file from memory of the mobile device, e.g., a photograph of a lost pet or child. In some embodiments, the image is a video captured by the mobile device, for example, by the user walking around the found item while capturing video of the item from multiple perspectives.

In some embodiments, the process 38 further includes receiving a prose description of the found item entered by a user of the mobile device, as indicated by block 48. For example, the interface for reporting found items may include a text box, and upon selecting the text box, for instance by touching or clicking on the text box, the user may be presented with a keyboard by which the user types in a prose description, or in some cases, an audio description by the user may be recorded with the mobile device.

Next in this embodiment, the found item record is sent to a lost-and-found system over a network, as indicated by block 50. The found item record may include the above-described captured data. In some cases, the found item record is sent along with an identifier of the user of the mobile device, for example, an identifier associated with a user profile in the user profile data repository 20 of FIG. 1. Further, in some cases, the found item record is sent with, or is later associated with, an identifier of a venue in the venue data repository 22. The found item record may be sent by the above-described mobile user device, and the found item record may be appended to the found item data repository 26 of FIG. 1 by the item-finder engine 32 in response the found item record being received by the web server 28 or the API server 30 along with a command to store the found item record. Accordingly, next in this embodiment, the found item record is received and stored, as indicated by block 52.

Next in this example, a request is received at the lost-and-found system, the request being for found items associated with the venue, and the request being from another user device, as indicated by block 54. The other user device may be a user device of the owner of the item, and that user may be querying the lost-and-found system for found item records corresponding to the item that was lost. Often, the party who lost an item recalls the venue at which the item was lost, so searching by venue is expected to increase the likelihood that the party will find their lost item. The request may be received by the above-described web server 28 or API server 30, and these components may instruct the item-finder engine 32 to query the venue records 22 for a venue matching that requested by the user or for presentation to the user to select a particular venue, and upon the user identifying a given venue, found item records associated with that venue may be retrieved from the found item data repository 26 by the item-finder engine 32. The corresponding found item records, or portions thereof, may then be returned to the searching party via the web server 28 or the API server 30, for example, in web content or in a structured data format, for example JSON or XML that is interpreted by scripts or other code executing on the user device for presentation to the searching party. The other user device may be a desktop computer executing a web browser that requested responsive found item records, or the other user device may be a mobile user device having a special-purpose application, such as the mobile application described above, for searching for found item records.

Next, the responsive items are sent to the other user device based on the request, as indicated by block 56. In some cases, the request includes a number of search criteria, such as a category of found items, a subcategory of found items, keywords to be associated with the found items, a time at which the item was lost, or various attributes of the found items, for example, a color, model, maker, size, or material. The searching party may view the responsive found item records and potentially identify the item with a lost. In some cases, the searching party may be presented with contact information for communicating with the user who found the item or the venue at which the item was found. Thus, in some embodiments, found item records include such contact information, or pointers to such contact information, in the user profile repository 20 or the venues repository 22, depending upon the implementation.

FIG. 3 shows an example of a process 58 for pushing lost-item alerts (or found-item alerts) to mobile devices of employees and other agents (e.g. volunteers) of a particular venue. In some cases, users lose items at a venue, and employees of that venue are often particularly well-suited for locating the lost item. Further, employees or other agents of venues tend to be more responsive to requests for help finding lost items, as such users have often already undertaken to assist with the operation of the venue. The process 58 may be performed by the above-described lost-and-found system 12 communicating with one or more of the user devices 14, which may be mobile user devices having the above-described special purpose mobile application.

In this embodiment, the process 58 includes receiving, with a server, a request to broadcast a lost-item alert, the request being associated with a venue, as indicated by block 60. The request may be received via the web server 28 or the API server 30, and in response, commands may be issued to the item-finder engine 32 that cause this component to retrieve a record of a corresponding venue and records associated with user profiles of employees or volunteers of the selected venue.

Based on the retrieved records, in this embodiment, agents of the venue are identified, as indicated by block 62. The term agents generally refers to either employees, volunteers, or other parties who have been associated with a given venue, e.g., residents. This step may be performed by the lost-and-found system 12, and in particular, the item-finder engine 32.

Next, in this embodiment, an alert is sent from the server to mobile devices of the agents of the venue, as indicated by block 64. The alert may be sent with a variety of techniques. For example, the telephone numbers of mobile devices of the users may be stored in the user profiles 20, and a text (e.g., SMS) message or recorded audio may be sent via a telephone network with a text or audio call, respectively, to the corresponding mobile devices. In another example, communication occurs via the mobile application on the user devices 14. For example, the mobile applications may run as a background process and periodically query the lost-and-found system 12 for lost-item alerts addressed to the mobile device. Or in another example, the mobile devices may maintain a session in a background process through which notices are pushed to the mobile devices, e.g., with a websocket connection.

The alert is received at the mobile devices, as indicated by block 66, and is displayed, as indicated by block 68. The alert may be displayed, as noted above, in the form of a text message or in the form of a audio call, or in some cases, the alert is displayed as an alert of the background process of the mobile application, for example, in a header display field of the mobile device. As noted above, a number of employees or volunteers may be associated with a given venue, and each of those parties may receive the alert.

In some cases, one of the agents of the venue may find the lost item, for example, in response to the alert. Accordingly, some embodiments of the process 58 include receiving with one of the mobile devices an indication that the lost item was found, as indicated by block 70. In some cases, the alert is presented on the mobile user device with an interface by which the user can indicate that they have found the lost item, for example, in a found item report that is pre-populated with information from the lost item report. This indication may be sent to the server from the mobile device to indicate that the lost item was found, as indicated by block 72, thereby potentially initiating the process the reuniting the party who lost an item with the item that was lost.

FIG. 4 shows an embodiment of a process 74 for broadcasting a lost-item alert to mobile devices of users within a selected geographic area. Often users lose items and know within some range of certainty where the item was lost. Accordingly, other users within some distance of that location are often better suited to finding the lost item than users in general. The process 74 may be performed by the above-described lost-and-found system 12 in cooperation with the user devices 14.

In this embodiment, the process 74 begins with receiving, with a server, a request to broadcast a lost-item alert from a mobile device, the request being associated with a geographic location of the mobile device, as indicated by block 76. In some cases, the request is associated with a latitude and a longitude of the mobile device, as sensed by a location sensor of the mobile device while a user of the mobile device interfaces with a lost item reporting interface of a mobile application on the mobile device. In another example, the location is manually entered by the user, for example as a street address.

Next, the process includes identifying other mobile devices within a threshold distance of the geographic location, as indicated by block 78. The other mobile devices may be identified with a variety of techniques. For example, in some cases, the mobile applications on the mobile user devices may periodically report back their location, and those locations may be associated with the user profiles in repository 20, such that the item-finder engine 32 can query the user profiles repository 20 to identify those users within a selected geographic area. In another example, the lost-and-found system 12 may transmit a command to all user devices executing the mobile application to self identify if (e.g., if an only if) those user devices are within the geographic area as determined by the mobile application.

Next in this embodiment, an alert is sent to the identified mobile devices with the server, as indicated by block 80. The alert that is sent may be similar or identical to the various examples of alerts sent in the process 58 described above with reference to FIG. 3.

FIG. 5 shows an embodiment of a process 82 for communicating contact information via a lock screen of a lost mobile device. The process 82 may be performed by the above-described lost-and-found system 12 in cooperation with one or more of the mobile user devices 14. In some cases, a user may lose their mobile device and wish to communicate with a party who found the mobile device without allowing the party to unlock what may be an otherwise locked mobile device. Embodiments of the process 82 allow the party who lost the mobile device to post a message on the lock screen of the mobile device, thereby indicating to a party who found the item how to return the item.

Accordingly, embodiments of the process 82 include sending, from a server, a lost-item alert for a lost mobile device, as indicated by block 84, and receiving, with the lost mobile device, while the lost mobile device is locked, the lost-item alert relating to the mobile device, as indicated by block 86. In some cases, the lost-item alert includes contact information for the owner of the lost mobile device. For example, the owner of the mobile device may communicate with the lost-and-found system 12 via some other user device (e.g., a desktop computer or friend's mobile device) a command to send the lost-item alert to their lost mobile device. In some cases, an address of the mobile device, for example, a telephone number or internet protocol (IP) address that is stored in association with the user profile in the user profile data repository 20 of the user who lost their device. In some cases, the mobile application on the lost user device executes as a background process and receives the lost-item alert, either by having the alert pushed to the device, or by periodically querying the lost-and-found system for alerts addressed to the device.

Next, in this embodiment, the contact information is displayed on a lock screen of the lost mobile device, as indicated by block 88. The contact information may include instructions for how to return the lost mobile device, a telephone number of the person who lost mobile device, or a location at which the person who lost mobile device will meet the person who found the item. Thus, embodiments allow a party to communicate with the finder of their smart phone (or other mobile device) without granting the finder of the smart phone access to secure portions of the smart phone operating system.

FIG. 6 shows an embodiment of a process 90 for causing a mobile device to alert those proximate the mobile device of its location. Again, the process 80 may be performed by the above-described lost-and-found system 12 in cooperation with one or more of the user devices 14. In this embodiment, the process 90 begins with sending from a server a request to signal the location of a mobile device with the mobile device to those proximate the mobile device, as indicated by block 92. In some cases, the mobile application may execute as a background process of the mobile device and receive this request, as indicated by block 94. In response to receiving the request, the mobile application may cause the mobile device to audibly, haptically (e.g. by vibrating), or visually (e.g. by flashing a screen or a light) indicate the location of the mobile device, as indicated by block 96. The address of the mobile device may be stored in association with a user profile, allowing the user to quickly initiate the above-sequence by logging in to their profile. Further, some embodiments may repeat the sequence above until the item is found or for a predetermined number of cycles, thereby allowing a user to search for a phone without having to repeatedly call the phone. Thus, in some cases, users may be able to find their lost mobile devices by triggering these indications.

FIG. 7 shows an embodiment of a process 98 for displaying the street address of a lost mobile device to those looking for the lost mobile device. This process 98 may be performed by the above-described lost-and-found system 12 in cooperation with one or more of the user devices 14. In this embodiment, the process 98 begins with receiving, at a server, from a user device, a request for the location of a lost mobile device, as indicated by block 100. The server may then send a lost item query to the corresponding lost mobile device, as indicated by block 102. In some cases, the request may be received from a user associated with the mobile device in the user profile data repository 20. The lost item query may then be received with the mobile device, as indicated by block 104, for example by the mobile application executing as a background process on the mobile device, monitoring incoming network traffic, or by periodically pulling messages from the server. In response, the background application may instruct a location sensor of a mobile device to sense the geographic location, as indicated by block 106, and the mobile application may send the location to the server, as indicated by block 108. Generally, the location may be sent as a coordinate, for example, a latitude and longitude, as mobile devices often do not store in memory street addresses associated with latitude and longitude. However, such coordinate are often relatively non-intuitive to users, who typically communicate about geographic locations with reference to street addresses. Accordingly, embodiments of the lost-and-found system 12 may query a geographic information system for a street address associated with the coordinates and determine the street address of the lost mobile device based on the sensed location, as indicated by block 110. The street address may be sent to the user device that initially requested location of the lost mobile device, as indicated by block 112. For example, a user may lose their phone, log into their account on the lost-and-found system 12, request the location of their lost phone, and in response, the lost-and-found system 12 may return a webpage indicating the street address of the lost phone.

FIG. 8 shows an embodiment of a process 114 for securing a lost mobile device remotely. Often, users lose their mobile devices, and those devices store sensitive private information of the user, for example, previous conversations, financial records, passwords, and contact information. Users frequently desire to secure such information when the mobile device is lost. Accordingly, embodiments perform the process 114 with the lost-and-found system 12 in cooperation with one or more of the user devices 14 described above with reference to FIG. 1.

In this example, the process 114 begins with receiving, at a server, a request to secure a lost mobile device, as indicated by block 116. Next, the server sends to the mobile device a command to secure the mobile device, as indicated by block 118. The mobile application on the mobile device described above may execute as a background process and receive this command, as indicated by block 120 (or the application may periodically pull such messages from the server). In response, the mobile application may lock the mobile device, as indicated by block 122. Locking the mobile device may include commanding an operating system of the mobile device to lock the mobile device, or the mobile application may include a separate locking mechanism, distinct from OS-provided locks, for disabling the mobile device. Locking the mobile device may include preventing a user from accessing memory of the mobile device without first entering a password. In some cases, embodiments also include terminating all applications on the mobile device in response to the command, as indicated by block 124.

FIG. 9 shows an embodiment of a process 126 for displaying the last known location of a lost item or a found item on a map display, e.g., an interactive geographic map displayed on a smartphone screen or monitor. The process 126 may be performed by the above-described lost-and-found system 12 in cooperation with one or more of the user devices 14. Often, multiple users are searching for lost items, and those users wish to coordinate their efforts. The party who lost the item often wishes to prominently display the last known location of the item, for example, by noting the last known location with a pin icon on a map to be presented to other users searching for the lost item. Or those who found an item may wish to denote the location at which the item was found. Embodiments facilitate the provision of such an interface. Embodiments are described with reference to lost items, but similar steps are used to register found items.

In this example, the process 126 begins with receiving, with the server, a lost item location from a user reporting a lost item, as indicated by block 128. Next, a map display depicting the lost item location with a pin icon is sent to user devices of other users, as indicated by block 130. The other users may launch the above-describe mobile application or request a corresponding webpage, and in response, the lost-and-found system 12 may transmit a map displaying the area around the lost item location with a pin icon indicating the lost item location. In some cases, information about lost item is received from the other user devices with the server, as indicated by block 132, and this information is associated with the lost item location in memory, as indicated by block 134, thereby facilitating efforts to find lost items. The icon may have any of a variety of shapes, for instance a pin image or an image indicate of the type of item lost, e.g., a paw print for a pet, and the icon may include information indicative of whether the item was lost or found, e.g., a paw print with an "L" for a lost pet or an "F" for a found pet. In some cases, the pinned map is sent to a set of users identified in the above-described lost-and-found system 12, e.g., other users selected by the party posting the pinned map, users associated with a venue selected by the party posting the pinned map, or users within some geographic distance (e.g., a threshold radius) of the pinned location. The pinned map display may be conveyed via a number of different media, including email, links to websites, and displays in the mobile application.

FIG. 10 shows an embodiment of a process 136 for pre-populating a lost item interface on a mobile application with information about a venue associated with a user of a mobile device presenting the lost item interface. Frequently employees or volunteers at a given venue find lost items (or receive reports of found items), and those agents may wish to register a lost or found item report with the lost-and-found system 12. The amount of effort to register this report can be reduced by pre-populating lost or found item interfaces with information about the venue with which the user is associated, thereby potentially reducing the amount of time consumed generating report.

In some embodiments, the process 136 includes launching a mobile application on a mobile device of an agent of the venue, as indicated by block 138, and associating the mobile device with the venue, as indicated by block 140. As noted above, the association may be stored on the mobile device or in the lost-and-found system 12. Next, a command to present a lost item reporting interface on the mobile device is received, as indicated by block 142. For example, the user may select an icon in the mobile application indicating an intent to register a report relating to a lost item or a found item. Next, in this embodiment, information about the venue, for example, in the venues data repository 22 of FIG. 1, is conveyed to the corresponding mobile device (for example in response to a corresponding request after receiving the command of block 142), and this information is used to pre-populate the lost or found item reporting interface, including for example, the name of the venue, the location of the venue, and the name of the reporting party. The process 136 may be used both for reporting lost items and for reporting found items.

Figure 12:
Figure 14:
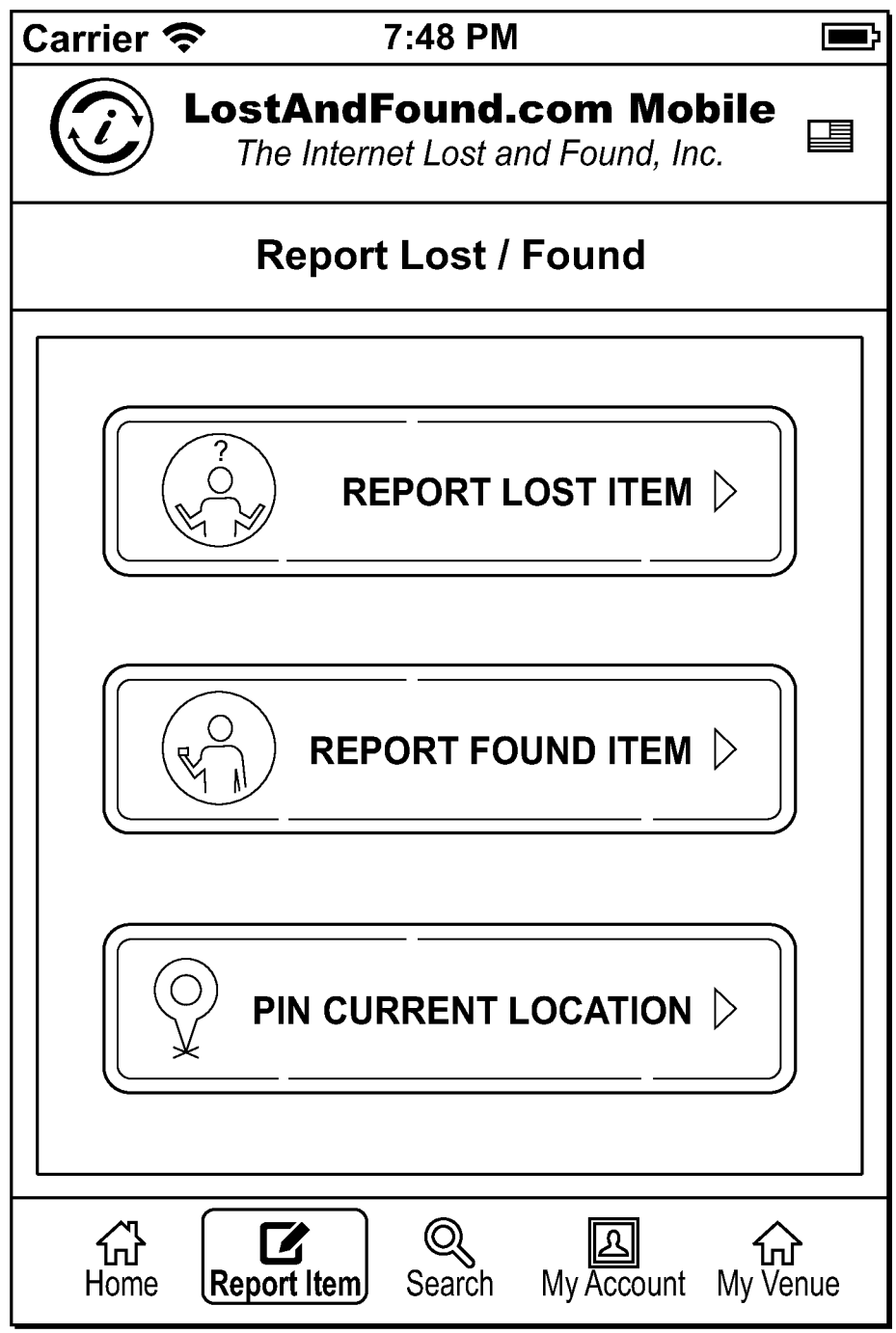
Figure 15:
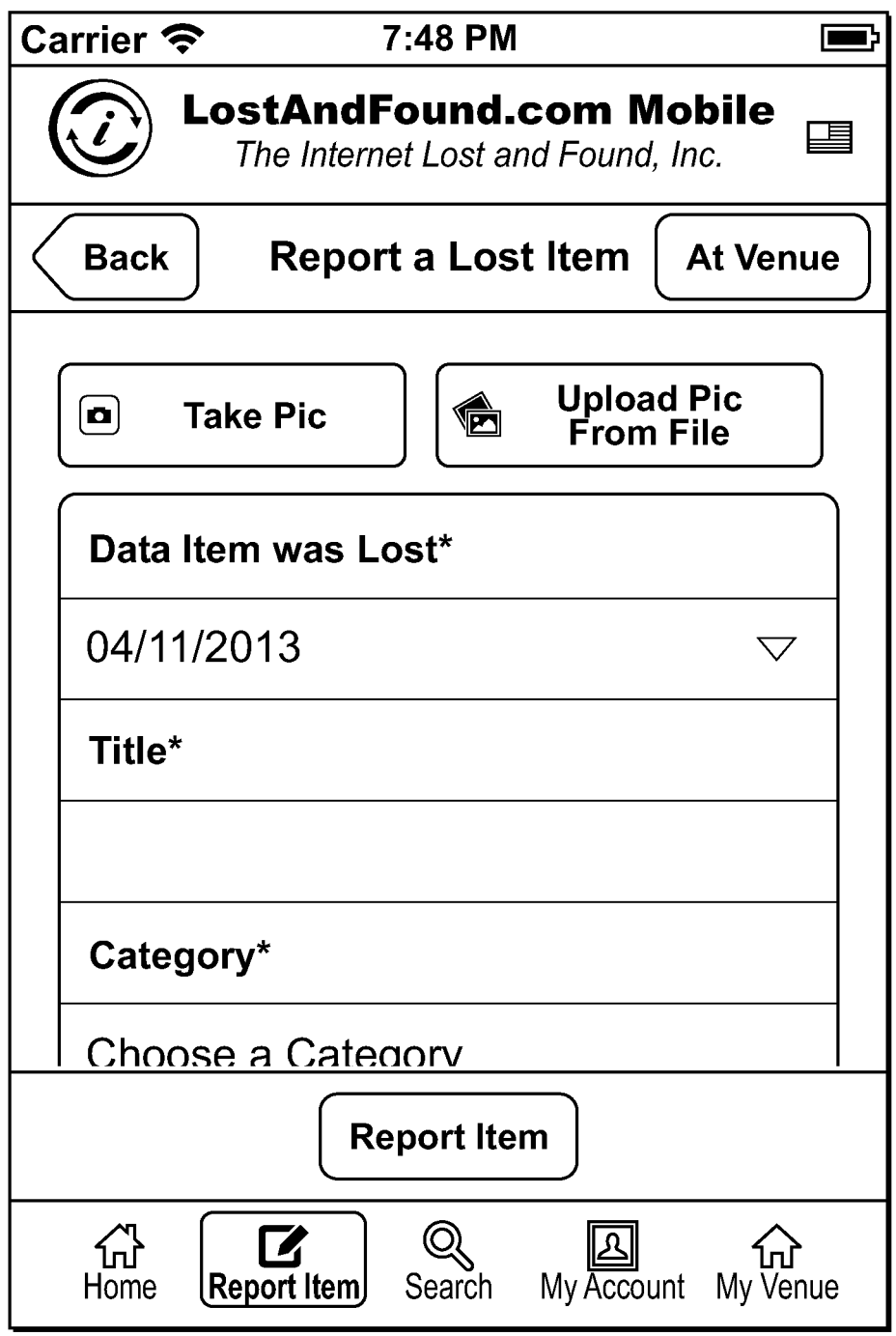
Figure 16:
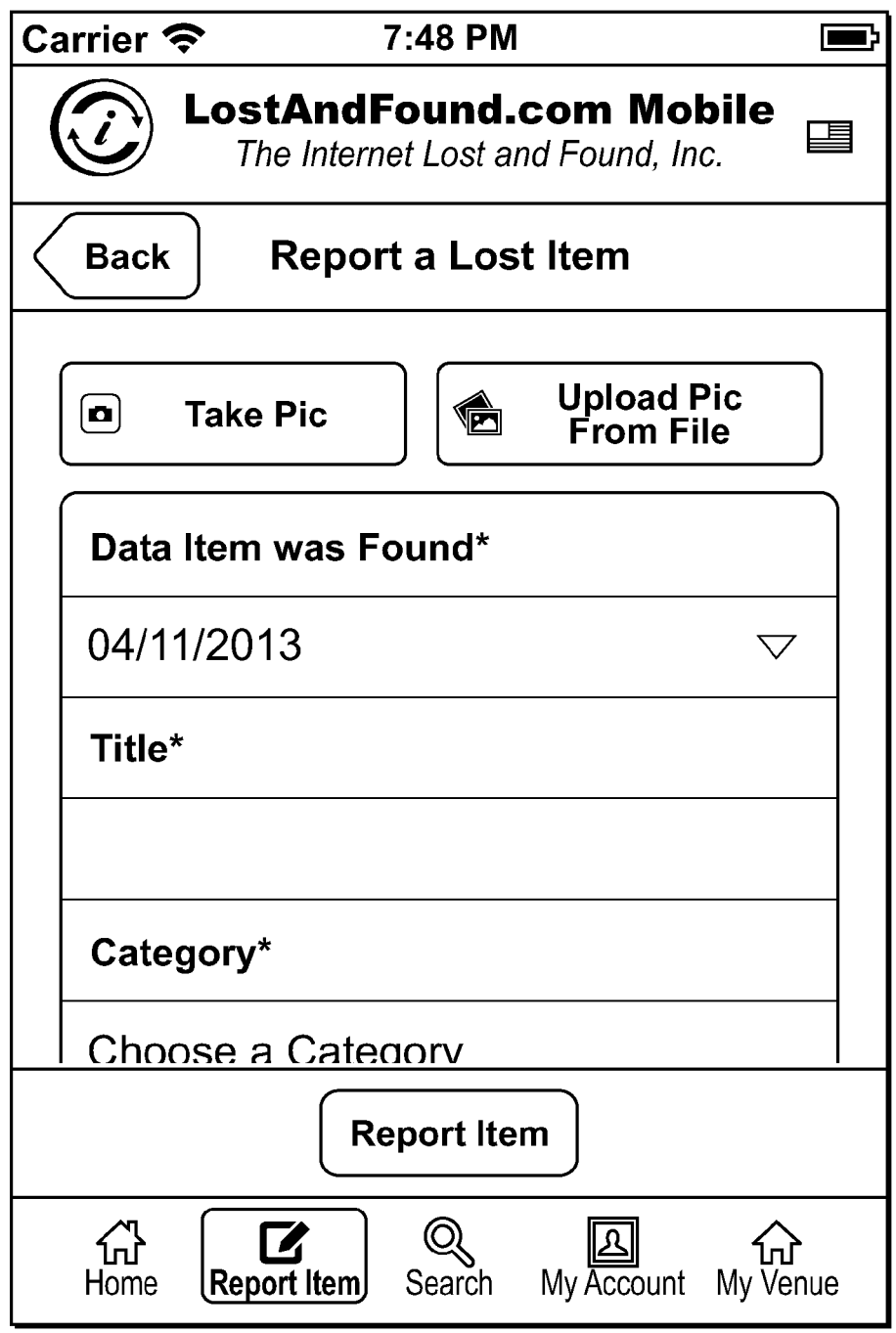
Figure 17:
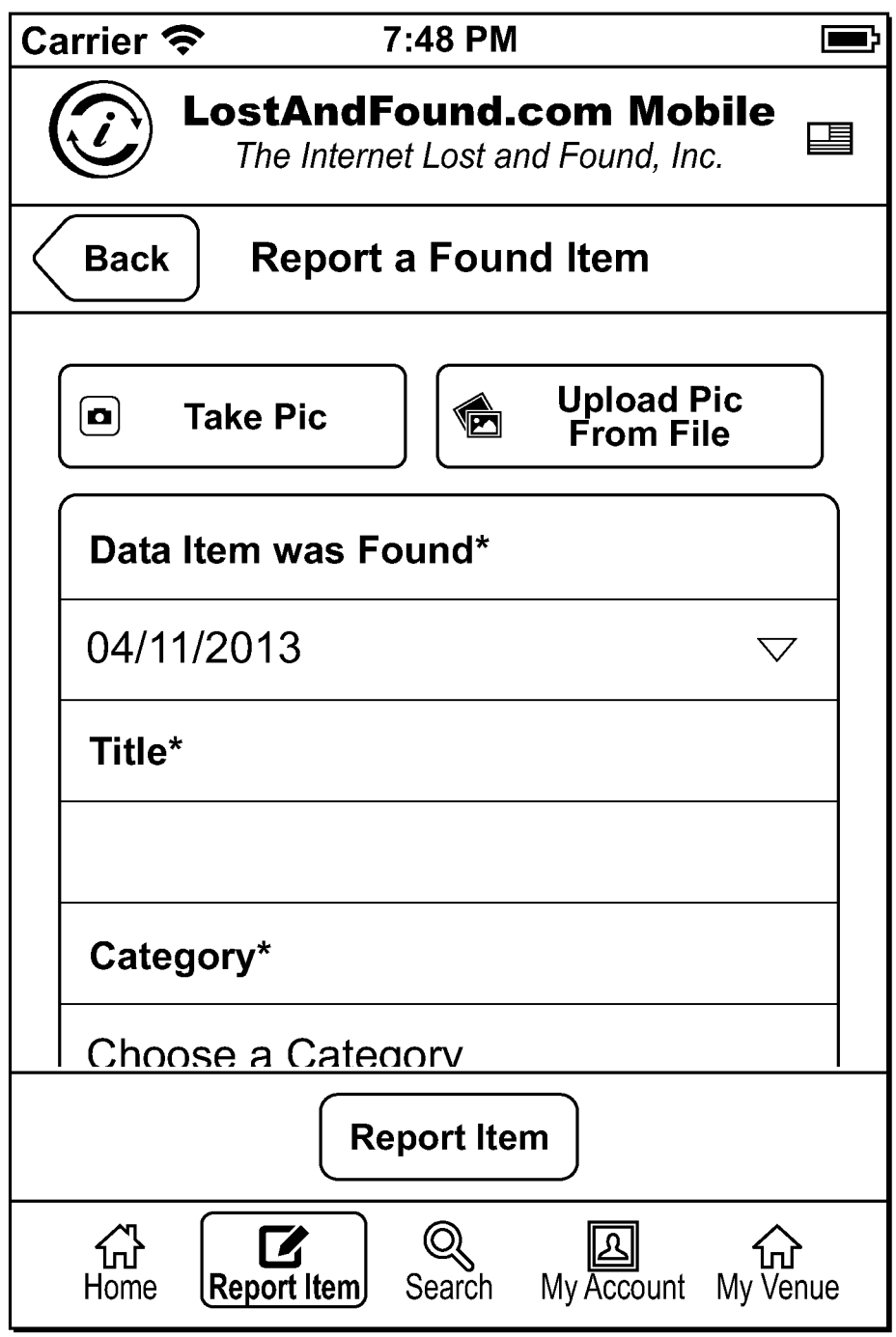
Figure 18:
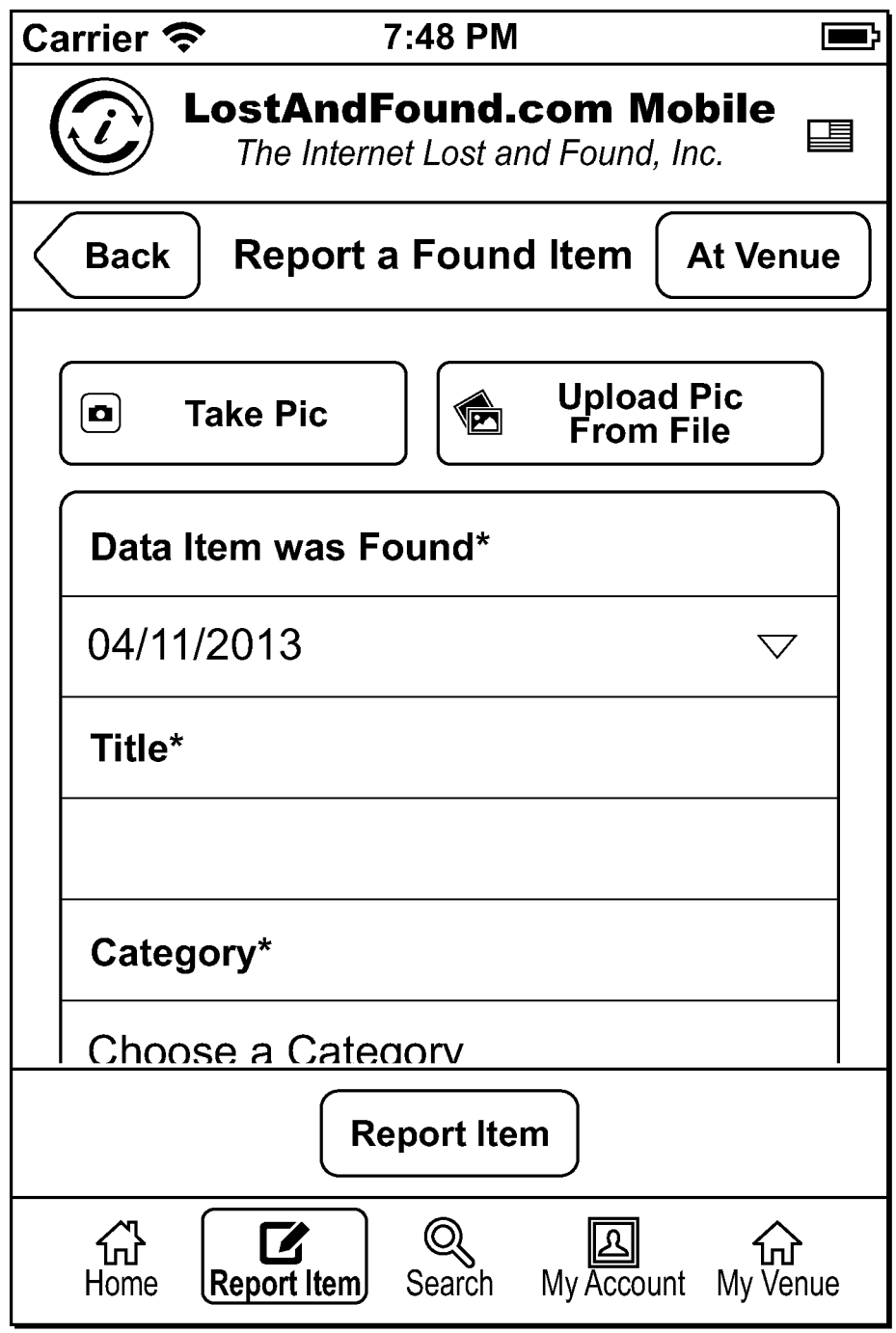
Figure 19:
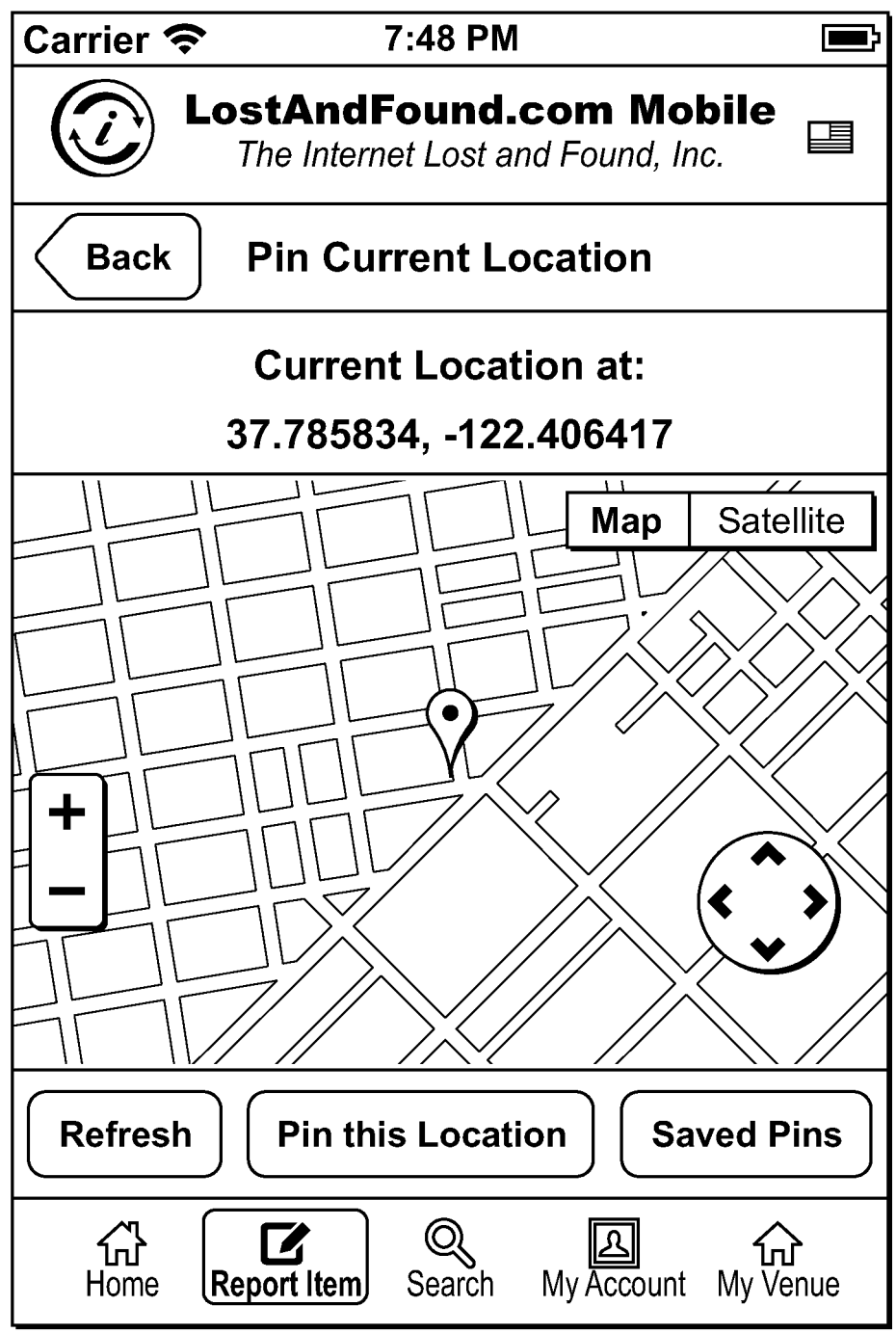
Figure 20:
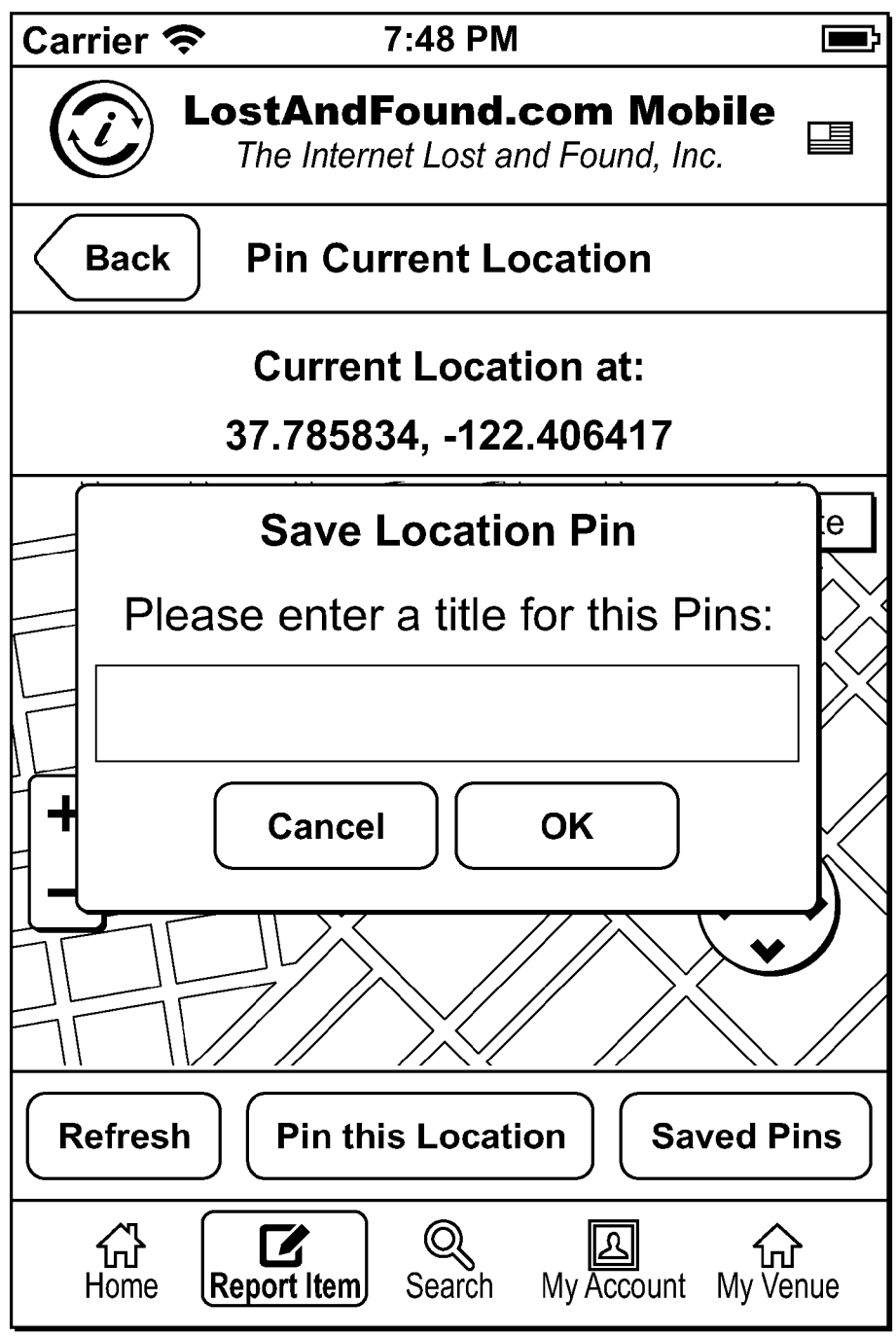
Figure 21:
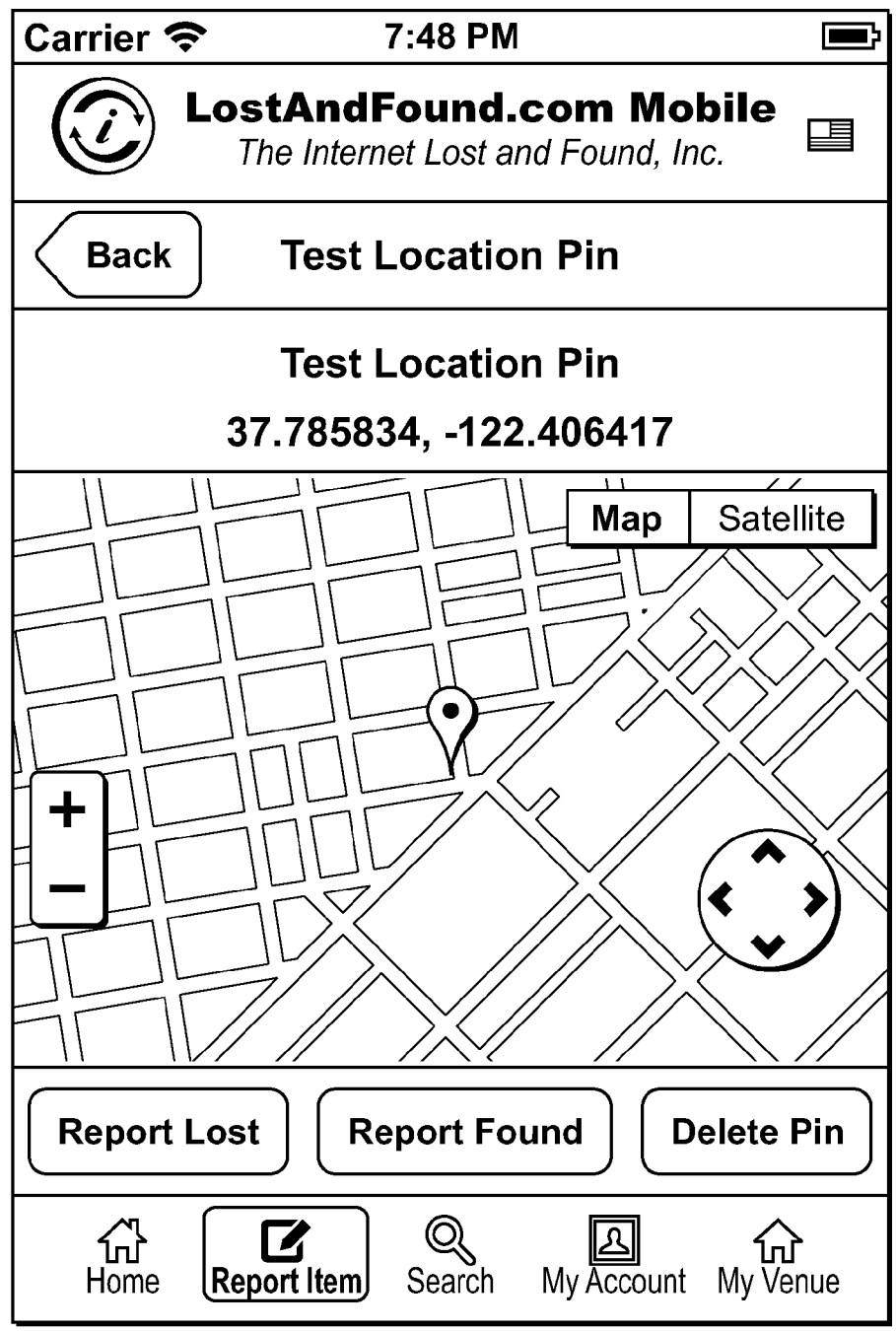
Figure 22:
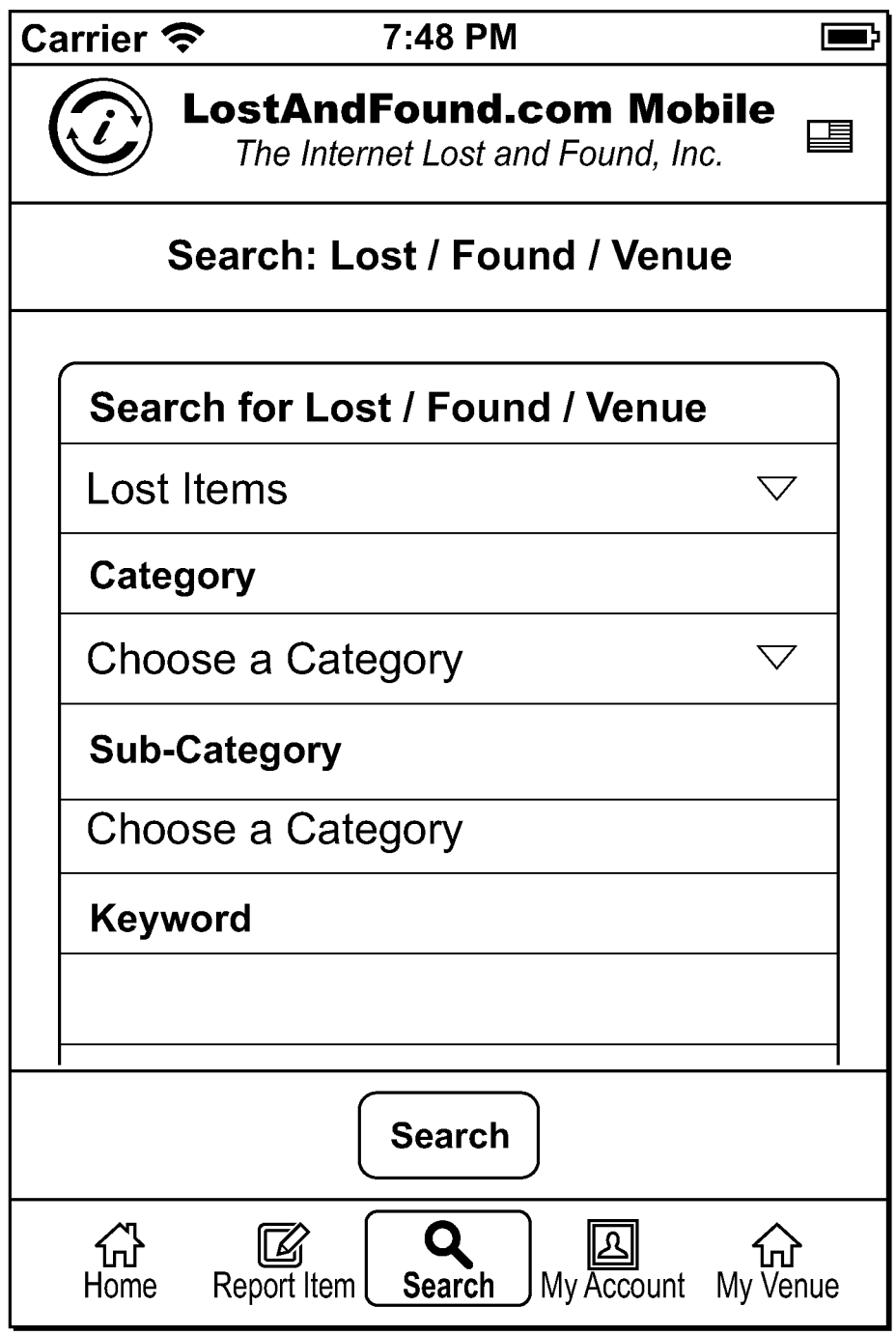
Figure 23:
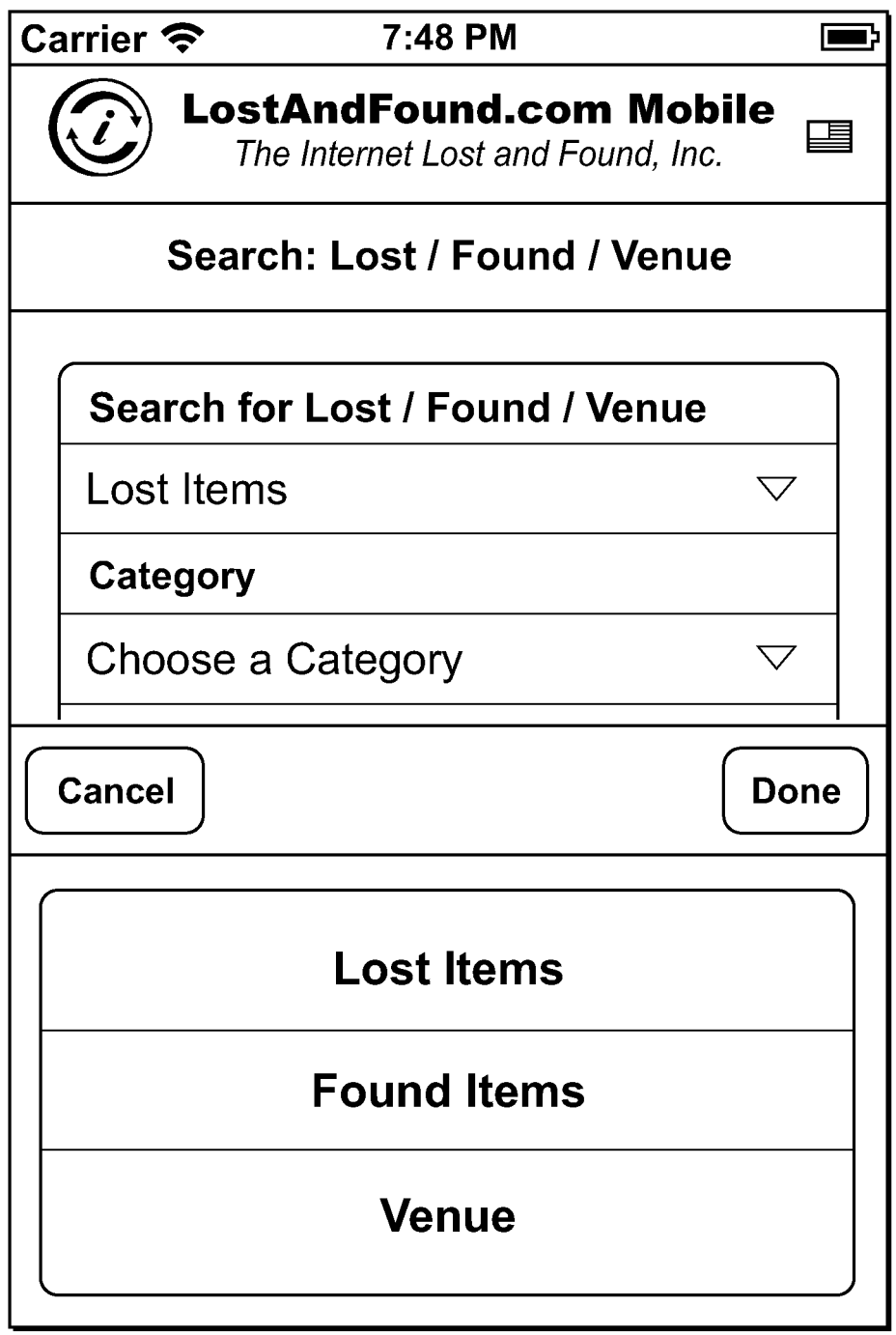
Figure 24:
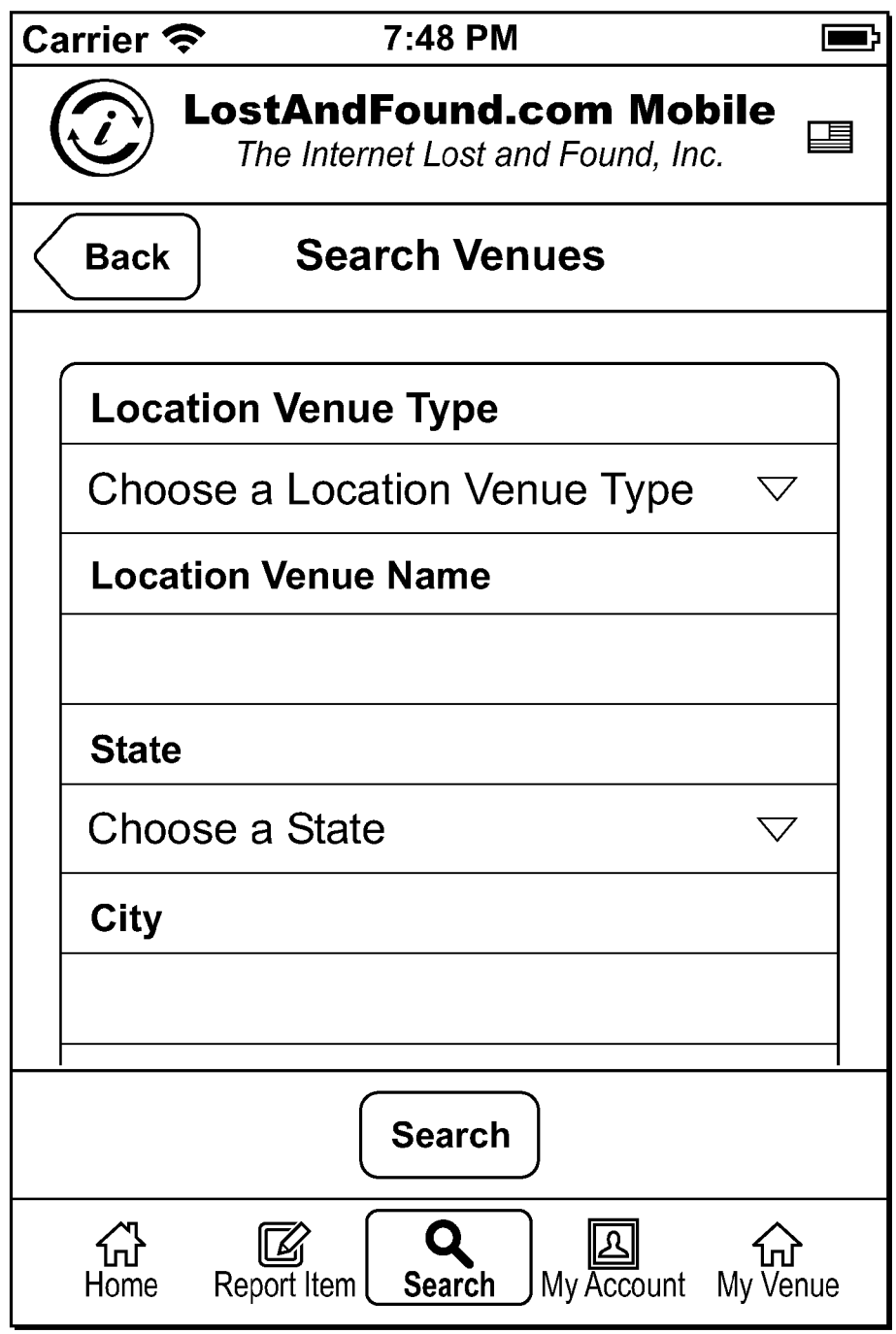

FIGS. 11 through 31 show examples of interfaces of a mobile application, such as the mobile application described above, for interacting with the lost-and-found system 12 on a mobile user device, such as a smart phone or tablet computer. FIG. 11 shows an example of listing details associated with a lost item report. FIG. 12 shows an example of an interface by which the listing owner associated with a lost item can be contacted. FIG. 13 shows an example of an interface by which lost or found items within a geographic area are displayed. FIG. 14 shows an example of an initial screen by which users indicate whether they wish to report lost items, reported found items, or indicate their current location. FIG. 15 shows an example of an interface by which a user reports a lost item. As noted, reporting a lost item may include both taking a picture and uploading a picture from a file, for example in memory of the phone. Uploading pictures stored in memory is helpful in situations in which the user wishes to display an image of an item that has been lost. FIG. 15 further includes an input labeled "add venue" by which a user can indicate that the lost item should be associated with a particular venue. FIG. 16 shows another interface for reporting a lost item without the venue input. FIG. 17 shows an interface for reporting a found item, including inputs by which both the user may take a picture of a found item or retrieve an image of a found item from memory. FIG. 18 shows another example of an interface by which a user may report found items. This interface including an input labeled "add venue" by which the item is associated with a particular venue. FIG. 19 includes a map display by which the user pins their current location, for example, for displaying the location to other users helping the user find a lost item. In some cases, multiple pins are saved in association with one of the user profiles described above. FIG. 20 shows an example of an interface by which the user save a given pin the location, which may include labeling depend location with a title. These locations, and the title, may be associated with the corresponding user profile. FIG. 21 shows an example of a map interface after a location has been pinned. As indicated, pins can be deleted, and other users can report a found item in association with the pin location. Further, lost items may be reported in association with the pin location. FIG. 22 shows an example of a search interface by which search criteria are entered for searching for lost or found items or venues. FIG. 23 shows an example of an interface by which the user specifies whether they wish to search for lost items, venues, or found items. FIG. 24 shows an example of an interface by which the user searches for particular venues.

Figure 25:
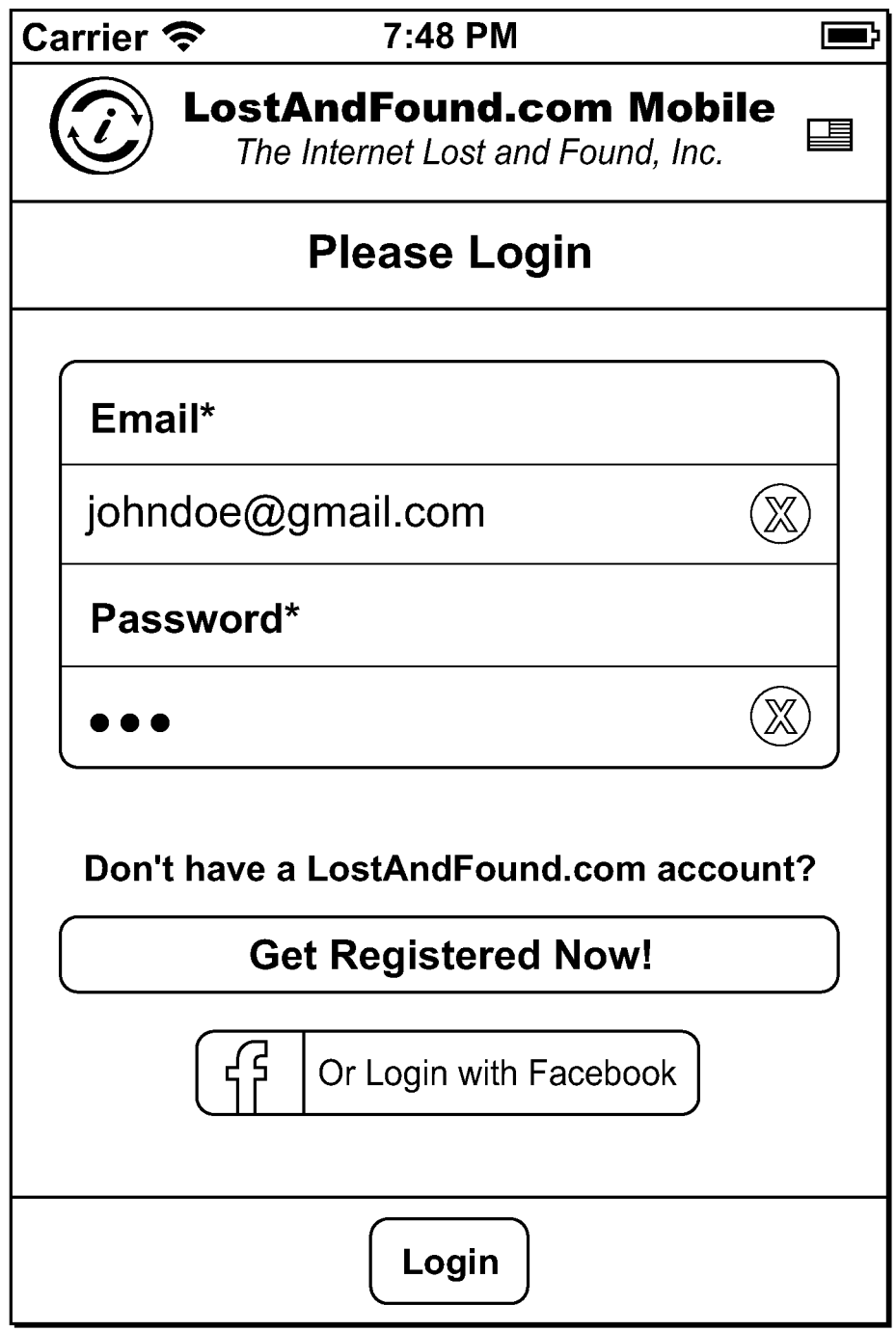

FIG. 25 shows an example of an interface by which the user logs into their account with the lost-and-found system 12. In some cases, the account is associated with a social networking account, e.g., with the OAuth protocol, and by which the user is linked with other users, for example, their friends within the social network. In some embodiments, lost item reports, found item reports, and pin locations are transmitted selectively to friends of the user based on associations within the social networking account.

Figure 26:
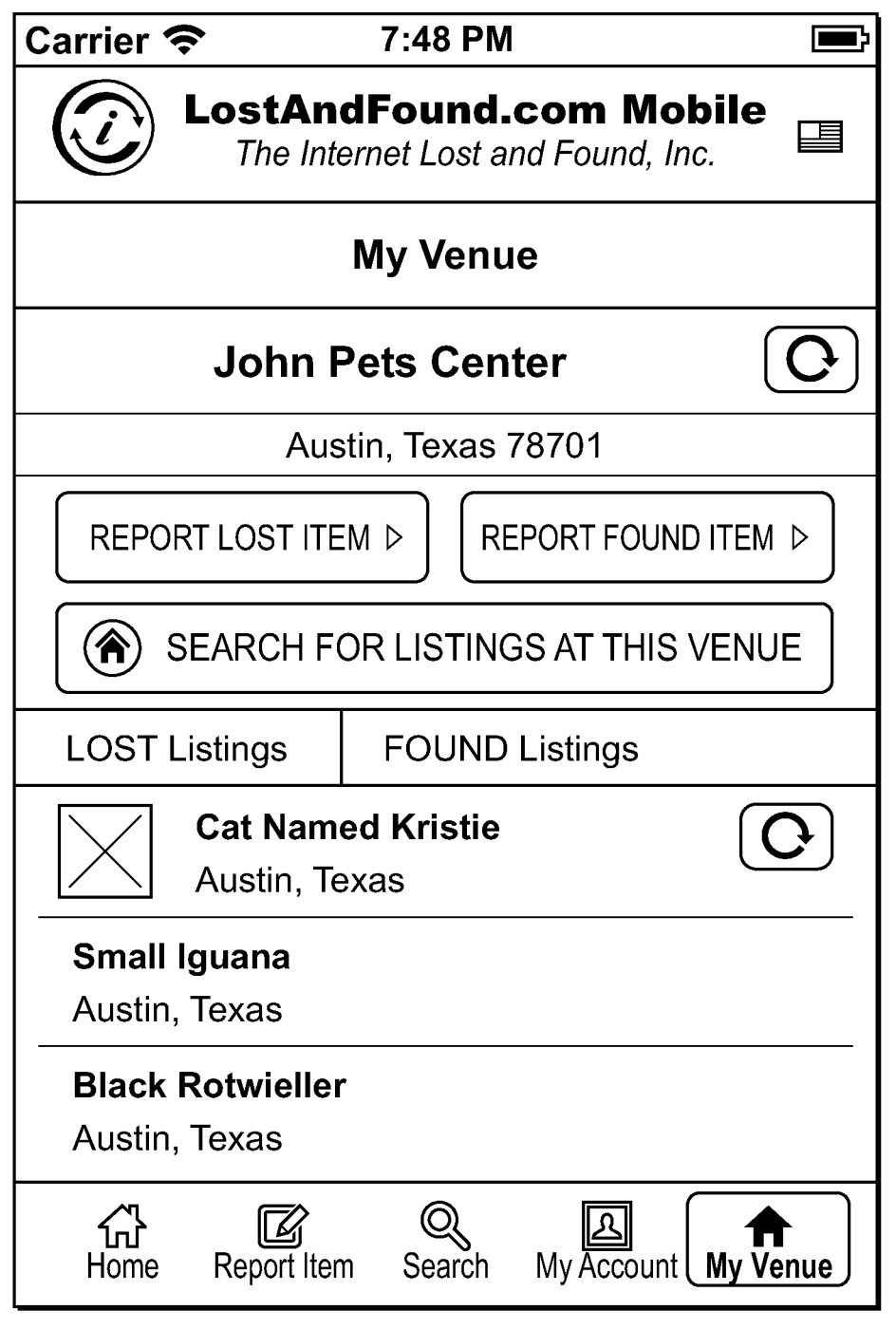
Figure 27:
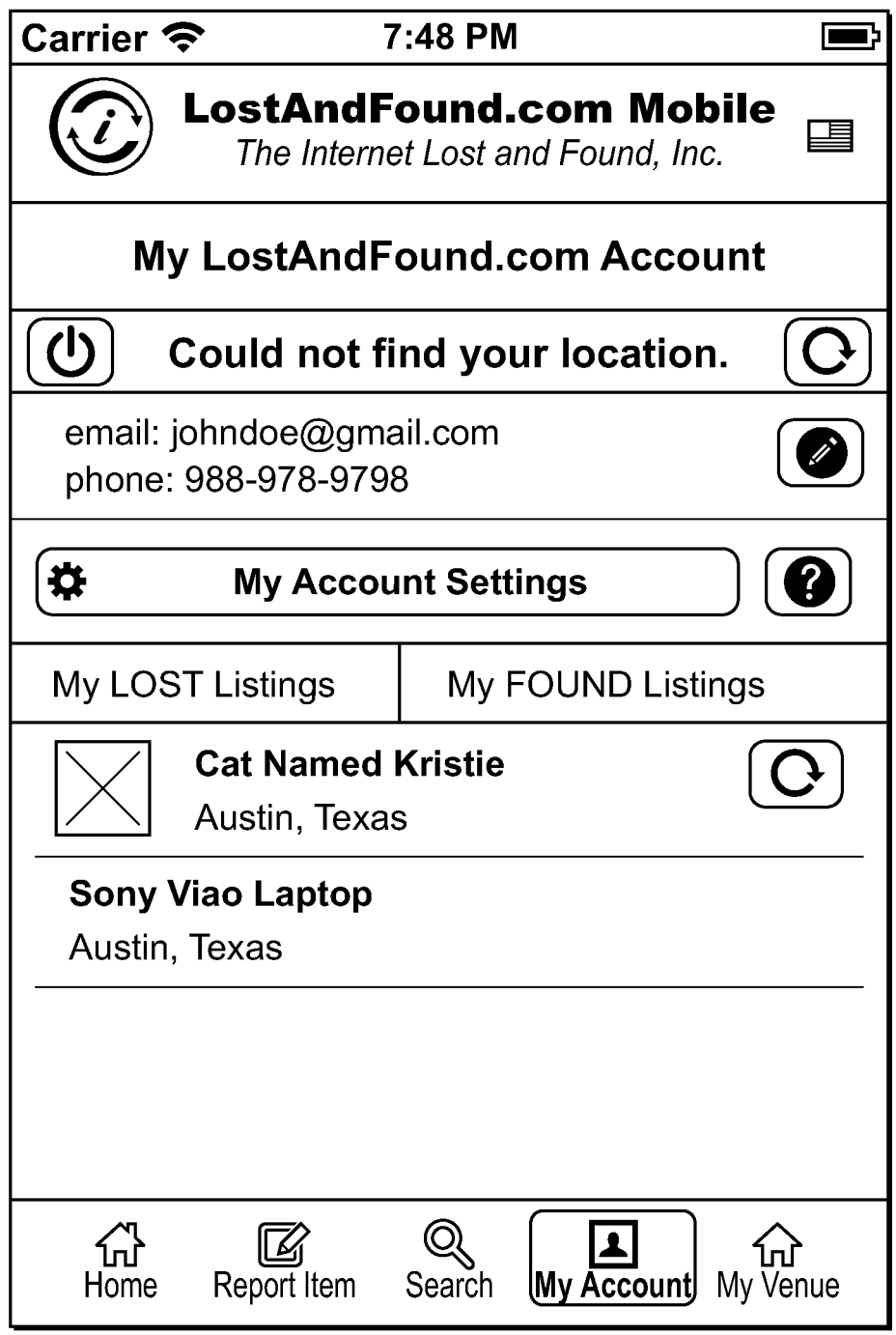
Figure 28:
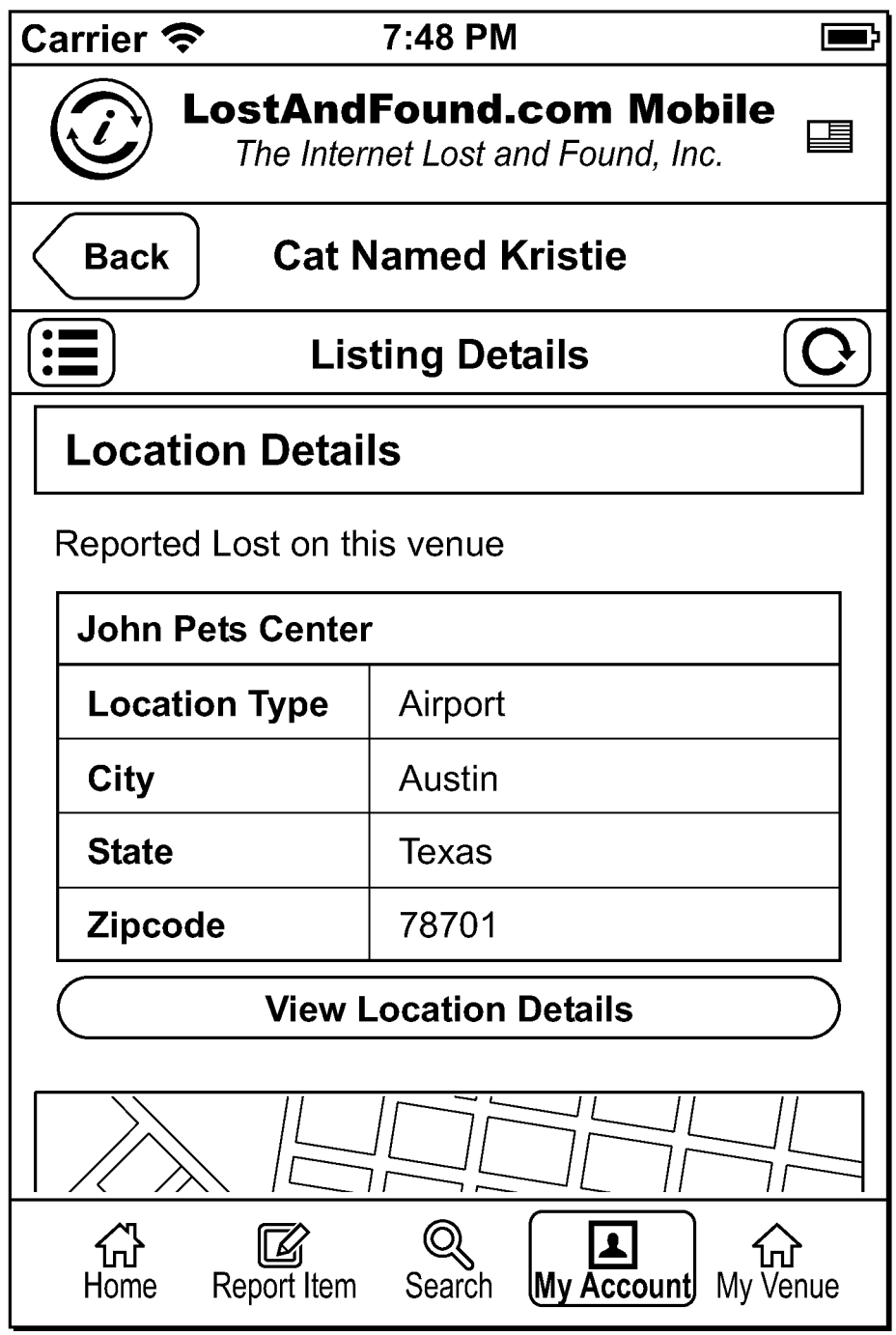
Figure 29:
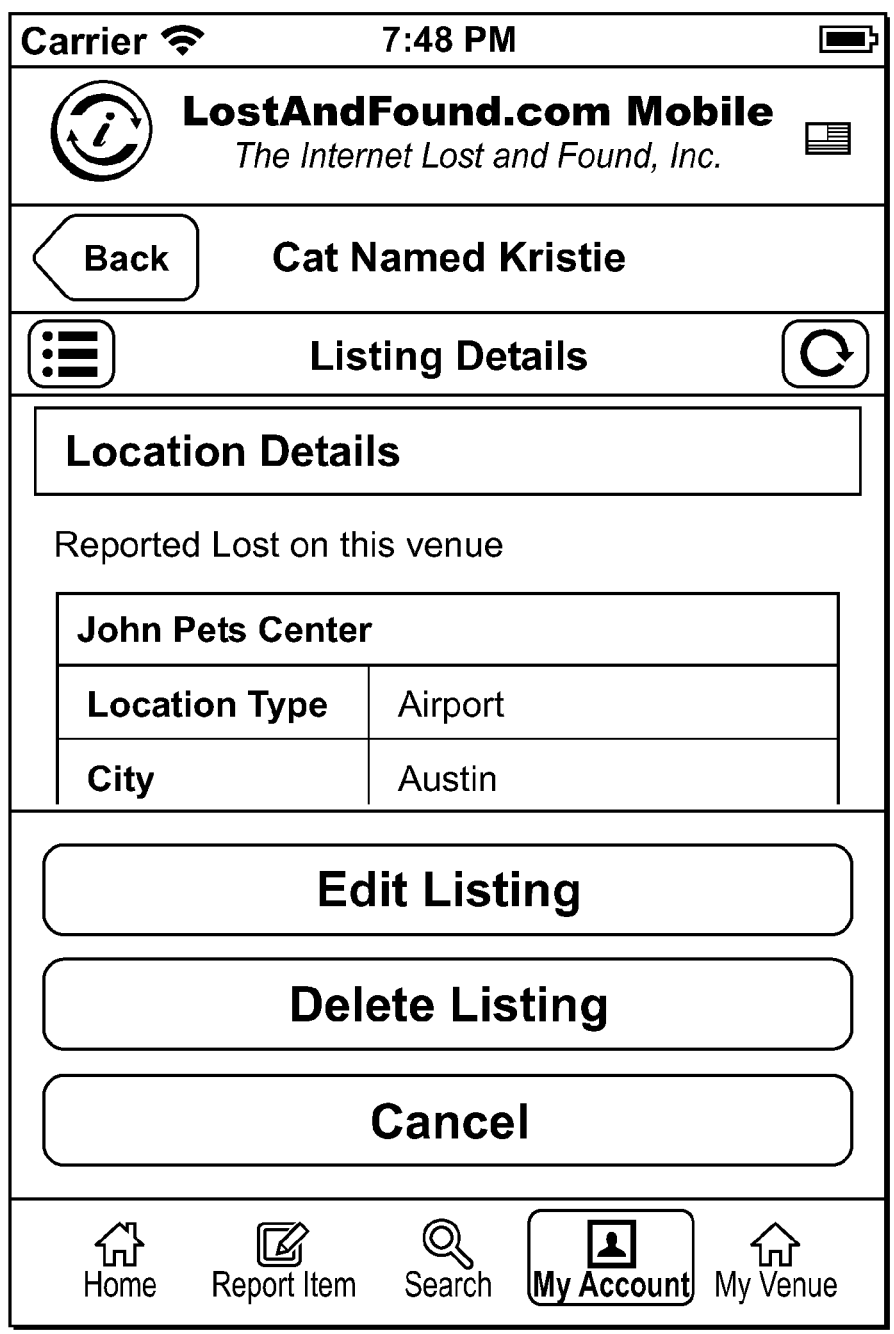
Figure 30:
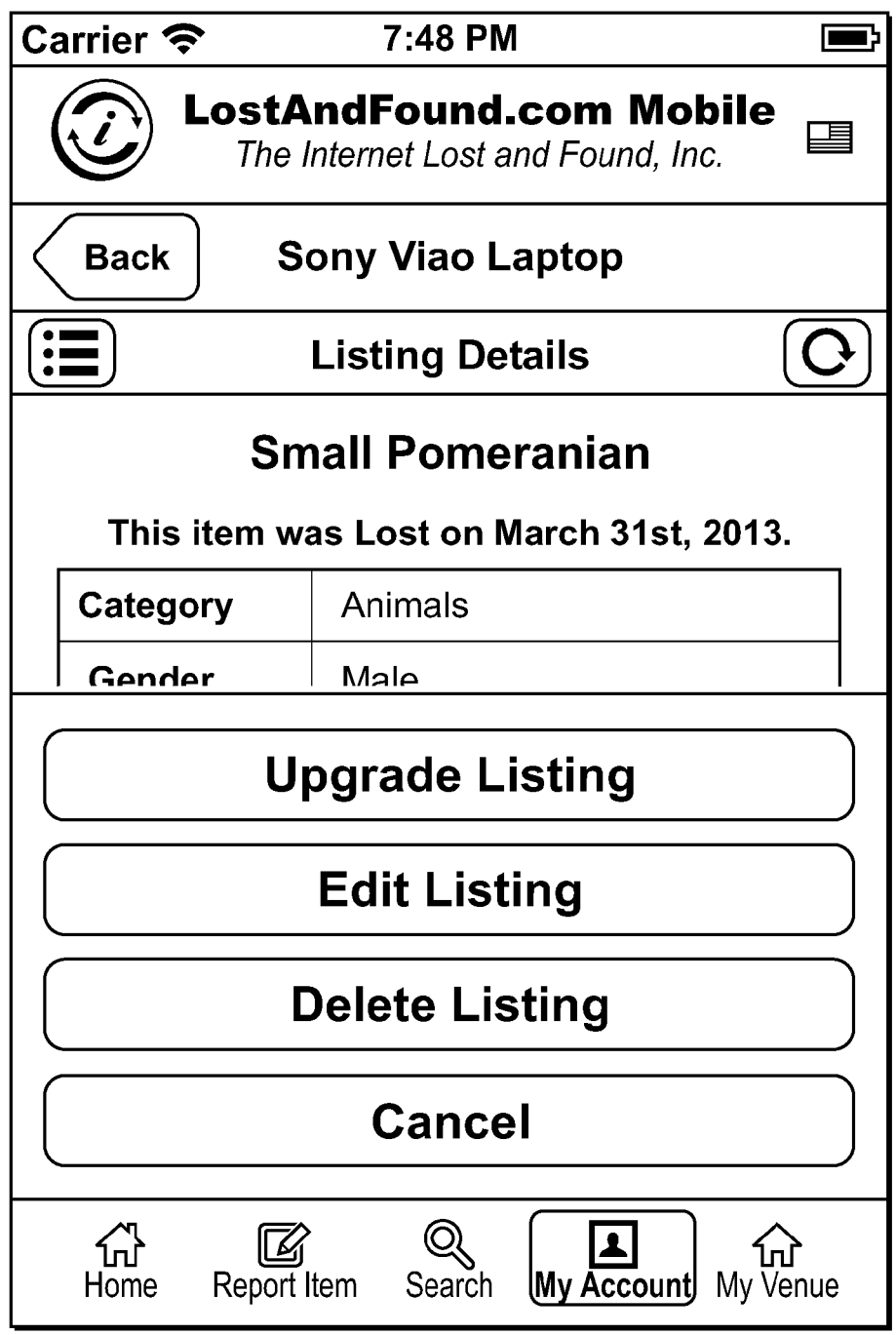
Figure 31:
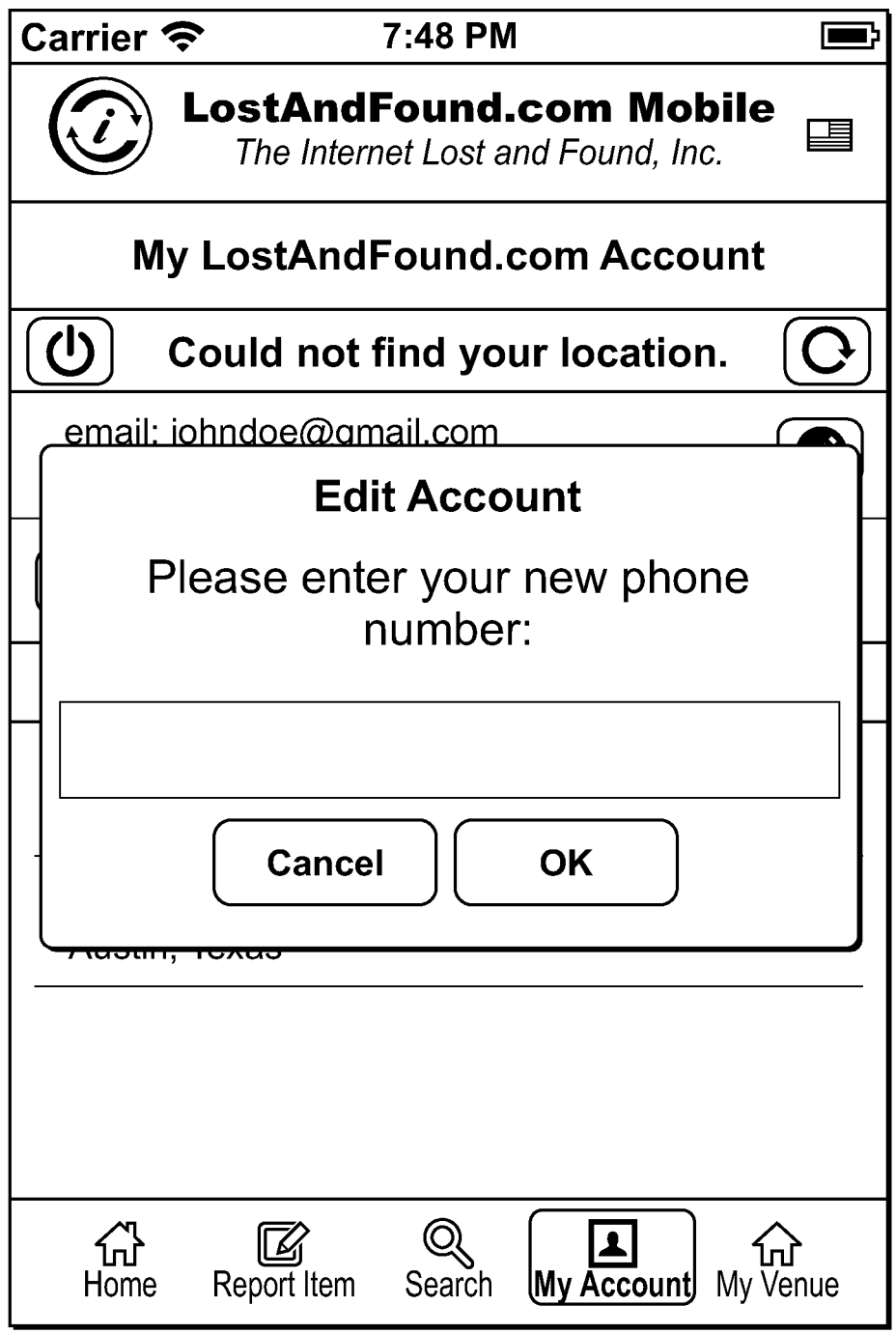

FIG. 26 shows an example of an interface associated with a venue by which the user reports items lost at the venue, items found at the venue, and searches for listings at the venue. FIG. 27 shows an example of an interface corresponding to an individual user profile by which the user views their own lost item listings and found item listings. FIG. 28 shows an example of an interface by which an individual listing is displayed, including details of the location of the listing. FIG. 29 shows an example of an interface by which a user indicates an intent to either edit listing details or delete a listing. FIG. 30 shows an example of an interface by which a user indicates an intent to upgrade a listing, edit listing details, or delete a listing. In some cases, lost item records or found item records are associated with an upgrade state indicating whether a user has paid to have the listing feature more prominently. Such listings may be displayed with a greater visual weight or given preference when ranking responsive search results, thereby highlighting those listings of greatest value to the users. FIG. 31 shows an example of an interface by which a user associates a phone number with their account for storage in the corresponding user profile in the data repository 20.

Thus, embodiments of the systems and processes described above may cooperate to help users find lost items and place lost items in the hands of the appropriate party. Embodiments may be configured to do this at a relatively large scale and relatively quickly, presenting information in a relatively rich format, for instance with images, maps, and the like.

Figure 32:
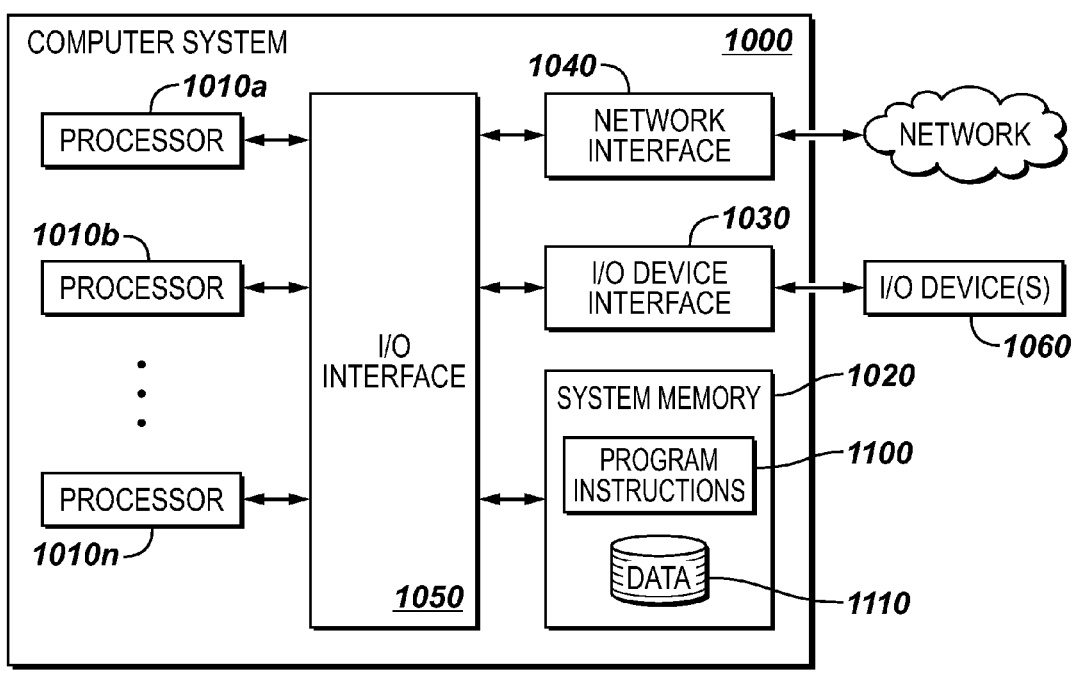
FIG. 32 shows an example of a computing device by which the above-mentioned processes and systems may be implemented.

FIG. 32 is a diagram that illustrates an exemplary computing system 1000 in accordance with embodiments of the present technique. Various portions of systems and methods described herein, may include or be executed on one or more computer systems similar to computing system 1000. Further, processes and modules described herein may be executed by one or more processing systems similar to that of computing system 1000.

Computing system 1000 may include one or more processors (e.g., processors 1010a-1010n) coupled to system memory 1020, an input/output I/O device interface 1030, and a network interface 1040 via an input/output (I/O) interface 1050. A processor may include a single processor or a plurality of processors (e.g., distributed processors). A processor may be any suitable processor capable of executing or otherwise performing instructions. A processor may include a central processing unit (CPU) that carries out program instructions to perform the arithmetical, logical, and input/output operations of computing system 1000. A processor may execute code (e.g., processor firmware, a protocol stack, a database management system, an operating system, or a combination thereof) that creates an execution environment for program instructions. A processor may include a programmable processor. A processor may include general or special purpose microprocessors. A processor may receive instructions and data from a memory (e.g., system memory 1020). Computing system 1000 may be a uni-processor system including one processor (e.g., processor 1010a), or a multi-processor system including any number of suitable processors (e.g., 1010a-1010n). Multiple processors may be employed to provide for parallel or sequential execution of one or more portions of the techniques described herein. Processes, such as logic flows, described herein may be performed by one or more programmable processors executing one or more computer programs to perform functions by operating on input data and generating corresponding output. Processes described herein may be performed by, and apparatus can also be implemented as, special purpose logic circuitry, e.g., an FPGA (field programmable gate array) or an ASIC (application specific integrated circuit). Computing system 1000 may include a plurality of computing devices (e.g., distributed computer systems) to implement various processing functions.

I/O device interface 1030 may provide an interface for connection of one or more I/O devices 1060 to computer system 1000. I/O devices may include devices that receive input (e.g., from a user) or output information (e.g., to a user). I/O devices 1060 may include, for example, graphical user interface presented on displays (e.g., a cathode ray tube (CRT) or liquid crystal display (LCD) monitor), pointing devices (e.g., a computer mouse or trackball), keyboards, keypads, touchpads, scanning devices, voice recognition devices, gesture recognition devices, printers, audio speakers, microphones, cameras, or the like. I/O devices 1060 may be connected to computer system 1000 through a wired or wireless connection. I/O devices 1060 may be connected to computer system 1000 from a remote location. I/O devices 1060 located on remote computer system, for example, may be connected to computer system 1000 via a network and network interface 1040.

Network interface 1040 may include a network adapter that provides for connection of computer system 1000 to a network. Network interface may 1040 may facilitate data exchange between computer system 1000 and other devices connected to the network. Network interface 1040 may support wired or wireless communication. The network may include an electronic communication network, such as the Internet, a local area network (LAN), a wide area network (WAN), a cellular communications network, or the like.

System memory 1020 may be configured to store program instructions 1100 or data 1110. Program instructions 1100 may be executable by a processor (e.g., one or more of processors 1010a-1010n) to implement one or more embodiments of the present techniques. Instructions 1100 may include modules of computer program instructions for implementing one or more techniques described herein with regard to various processing modules. Program instructions may include a computer program (which in certain forms is known as a program, software, software application, script, or code). A computer program may be written in a programming language, including compiled or interpreted languages, or declarative or procedural languages. A computer program may include a unit suitable for use in a computing environment, including as a stand-alone program, a module, a component, or a subroutine. A computer program may or may not correspond to a file in a file system. A program may be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program may be deployed to be executed on one or more computer processors located locally at one site or distributed across multiple remote sites and interconnected by a communication network.

System memory 1020 may include a tangible program carrier having program instructions stored thereon. A tangible program carrier may include a non-transitory computer readable storage medium. A non-transitory computer readable storage medium may include a machine readable storage device, a machine readable storage substrate, a memory device, or any combination thereof. Non-transitory computer readable storage medium may include non-volatile memory (e.g., flash memory, ROM, PROM, EPROM, EEPROM memory), volatile memory (e.g., random access memory (RAM), static random access memory (SRAM), synchronous dynamic RAM (SDRAM)), bulk storage memory (e.g., CD-ROM and/or DVD-ROM, hard-drives), or the like. System memory 1020 may include a non-transitory computer readable storage medium that may have program instructions stored thereon that are executable by a computer processor (e.g., one or more of processors 1010a-1010n) to cause the subject matter and the functional operations described herein. A memory (e.g., system memory 1020) may include a single memory device and/or a plurality of memory devices (e.g., distributed memory devices).

I/O interface 1050 may be configured to coordinate I/O traffic between processors 1010a-1010n, system memory 1020, network interface 1040, I/O devices 1060, and/or other peripheral devices. I/O interface 1050 may perform protocol, timing, or other data transformations to convert data signals from one component (e.g., system memory 1020) into a format suitable for use by another component (e.g., processors 1010a-1010n). I/O interface 1050 may include support for devices attached through various types of peripheral buses, such as a variant of the Peripheral Component Interconnect (PCI) bus standard or the Universal Serial Bus (USB) standard.

Embodiments of the techniques described herein may be implemented using a single instance of computer system 1000 or multiple computer systems 1000 configured to host different portions or instances of embodiments. Multiple computer systems 1000 may provide for parallel or sequential processing/execution of one or more portions of the techniques described herein.

Those skilled in the art will appreciate that computer system 1000 is merely illustrative and is not intended to limit the scope of the techniques described herein. Computer system 1000 may include any combination of devices or software that may perform or otherwise provide for the performance of the techniques described herein. For example, computer system 1000 may include or be a combination of a cloud-computing system, a data center, a server rack, a server, a virtual server, a desktop computer, a laptop computer, a tablet computer, a server device, a client device, a mobile telephone, a personal digital assistant (PDA), a mobile audio or video player, a game console, a vehicle-mounted computer, or a Global Positioning System (GPS), or the like. Computer system 1000 may also be connected to other devices that are not illustrated, or may operate as a stand-alone system. In addition, the functionality provided by the illustrated components may in some embodiments be combined in fewer components or distributed in additional components. Similarly, in some embodiments, the functionality of some of the illustrated components may not be provided or other additional functionality may be available.

Those skilled in the art will also appreciate that while various items are illustrated as being stored in memory or on storage while being used, these items or portions of them may be transferred between memory and other storage devices for purposes of memory management and data integrity. Alternatively, in other embodiments some or all of the software components may execute in memory on another device and communicate with the illustrated computer system via inter-computer communication. Some or all of the system components or data structures may also be stored (e.g., as instructions or structured data) on a computer-accessible medium or a portable article to be read by an appropriate drive, various examples of which are described above. In some embodiments, instructions stored on a computer-accessible medium separate from computer system 1000 may be transmitted to computer system 1000 via transmission media or signals such as electrical, electromagnetic, or digital signals, conveyed via a communication medium such as a network or a wireless link. Various embodiments may further include receiving, sending, or storing instructions or data implemented in accordance with the foregoing description upon a computer-accessible medium. Accordingly, the present invention may be practiced with other computer system configurations.

It should be understood that the description and the drawings are not intended to limit the invention to the particular form disclosed, but to the contrary, the intention is to cover all modifications, equivalents, and alternatives falling within the spirit and scope of the present invention as defined by the appended claims. Further modifications and alternative embodiments of various aspects of the invention will be apparent to those skilled in the art in view of this description. Accordingly, this description and the drawings are to be construed as illustrative only and are for the purpose of teaching those skilled in the art the general manner of carrying out the invention. It is to be understood that the forms of the invention shown and described herein are to be taken as examples of embodiments. Elements and materials may be substituted for those illustrated and described herein, parts and processes may be reversed or omitted, and certain features of the invention may be utilized independently, all as would be apparent to one skilled in the art after having the benefit of this description of the invention. Changes may be made in the elements described herein without departing from the spirit and scope of the invention as described in the following claims. Headings used herein are for organizational purposes only and are not meant to be used to limit the scope of the description.

As used throughout this application, the word "may" is used in a permissive sense (i.e., meaning having the potential to), rather than the mandatory sense (i.e., meaning must). The words "include", "including", and "includes" and the like mean including, but not limited to. As used throughout this application, the singular forms "a," "an," and "the" include plural referents unless the content explicitly indicates otherwise. Thus, for example, reference to "an element" or "a element" includes a combination of two or more elements, notwithstanding use of other terms and phrases for one or more elements, such as "one or more." The term "or" is, unless indicated otherwise, non-exclusive, i.e., encompassing both "and" and "or." Terms describing conditional relationships, e.g., "in response to X, Y," "upon X, Y,", "if X, Y," "when X, Y," and the like, encompass causal relationships in which the antecedent is a necessary causal condition, the antecedent is a sufficient causal condition, or the antecedent is a contributory causal condition of the consequent, e.g., "state X occurs upon condition Y obtaining" is generic to "X occurs solely upon Y" and "X occurs upon Y and Z." Such conditional relationships are not limited to consequences that instantly follow the antecedent obtaining, as some consequences may be delayed, and in conditional statements, antecedents are connected to their consequents, e.g., the antecedent is relevant to the likelihood of the consequent occurring. Further, unless otherwise indicated, statements that one value or action is "based on" another condition or value encompass both instances in which the condition or value is the sole factor and instances in which the condition or value is one factor among a plurality of factors. Unless specifically stated otherwise, as apparent from the discussion, it is appreciated that throughout this specification discussions utilizing terms such as "processing," "computing," "calculating," "determining" or the like refer to actions or processes of a specific apparatus, such as a special purpose computer or a similar special purpose electronic processing/computing device.

What is claimed is:

1. A system, comprising:
   a lost-and-found system, implemented with one or more processors, the lost-and-found system having a server and a data repository, the data repository storing venue records,
   wherein the lost-and-found system is operative to:
     first receive at least one report of a found item or of a lost item from a lost-and-found mobile application, wherein each of the found items or each of the lost items is associated with at least one of the venue records, and wherein each of the venue records includes one or more of a geographic location of one venue, a unique identifier of the one venue, a category of the one venue, a sub-category of the one venue, pointers to user records of users associated with the one venue, pointers to lost item records associated with the one venue, and pointers to found item records associated with the one venue;
     second receive a request to send a lost-item alert or a found-item alert, the request being associated with a venue in the venue records;
     select one or more addresses of mobile devices of agents of the venue based on the venue associated with the received request; and
     send an alert to each of the selected addresses of the mobile devices of the agents.

2. The system of claim 1, wherein the request is associated with a geographic location,
   wherein the lost-and-found system is further operative to identify mobile devices within a threshold distance of the geographic location, and
   wherein the alert is sent to the identified mobile devices.

3. The system of claim 2, wherein the request is further associated with a latitude and a longitude.

4. The system of claim 1, wherein the lost-and-found system is further operative to:
   transmit to a lost mobile device that is locked a lost-item alert relating to the lost mobile device, the lost-item alert including contact information for the owner of the lost mobile device or location recovery instructions for the owner of the lost mobile device and causing the lost-and-found application to
     display, on a lock screen of the lost mobile device, the contact information, the location recovery instructions for the owner of the lost mobile device, or both.

5. The system of claim 1, wherein the lost-and-found system is further operative to:
   transmit to a lost mobile device a request to signal the location of the lost mobile device with the lost mobile device to those proximate the lost mobile device, wherein the signal
   audibly, haptically, or visually indicates the location of the lost mobile device.

6. The system of claim 1, wherein:
   the lost-and-found system is further operative to:
     receive, from a user device, a request for the location of a lost mobile device;
     send a lost item query to mobile device;
     determine a street address of the lost mobile device based on a responsive sensed location; and
     send the street address to the user device.

7. The system of claim 1, wherein:
   the lost-and-found system is operative to:
     receive a request to secure a lost mobile device; and
     send a command to secure the lost mobile device,
   wherein the command causes the mobile application to:
     lock the lost mobile device and
     terminate all applications on the lost mobile device.

8. The system of claim 1, wherein the lost-and-found system is operative to:
   receive a lost-item location from a user reporting a lost item; and
   send to user devices of other users, a map display depicting the lost item location with a pin icon.

9. The system of claim 1, wherein the lost-and-found system is operative to:
   transmit to a lost mobile device a command to present a lost-item reporting interface that is pre-populated with location information of the venue.

10. The system of claim 1, further comprising:
    a plurality of mobile devices each having a lost-and-found mobile application, the lost-and-found mobile application being operative to report the found item or the lost item and associate the found item or the lost item with one of the venue records.

11. The system of claim 10, wherein the mobile application is operative to:
    receive the alert at the selected mobile devices; and
    display the alert with the selected mobile devices.

12. The system of claim 10, wherein the lost-and-found mobile application is further operative to display to a user an opportunity for selecting a current location of a mobile device or manually entering some other location.

13. The system of claim 1, wherein the venue is an airline, an airport, an amusement park, a rental car, a hotel, a sports venue, a park, a school, a retail store, a restaurant, or a doctor's office.

14. The system of claim 1, wherein the agents of the venue are all employees, residents, or volunteers of the venue or the agents of the venue are a subset of the employees, residents, or volunteers of the venue.

15. The system of claim 1, wherein the lost-and-found system provides information for a lost item pinning interface by which a user can identify a location of a found item or a lost item on a map.

16. The system of claim 1, wherein each of the received reports of a found item or a lost item includes one or more of a unique identifier, a description in prose of the item, an image of the item, a category of the item, a subcategory of the item, a date that the item was reported, comments on the item, a flag indicating whether the item has been found or claimed, a value indicative of whether a user has paid to have the item featured prominently, and a pointer to a user profile record of a user who reported the item.

17. The system of claim 1, wherein the association between each of the found items or each of the lost items and the one venue record comprises at least one of reading from the data repository or writing to the data repository, respectively.

18. The system of claim 1, wherein the lost-and-found system is further operative to:
    receive a request for querying the venue records for a venue matching that requested, wherein the request includes criteria including one or more of a category of the found or lost item, a subcategory of the found or lost item, a keyword to be associated with the found or lost item, a time at which the item was lost or found, a color attribute of the lost or found item, a model attribute of the lost or found item, a maker attribute of the lost or found item, a size attribute of the lost or found item, or a material attribute of the lost or found item; and
    transmit responsive items based on the request.

19. The system of claim 1, wherein the alert is sent in the form of a text message, in the form of an audio call, or from a background process of the lost-and-found application.

20. The system of claim 1, wherein the first and second receiving operations of the lost-and-found system are received at the lost-and-found system at substantially the same time.

21. The system of claim 1, wherein the at least one report is incorporated into the request, or wherein receiving the at least one report operates as the request.

* * * * *